United States Patent
Suzuki

(10) Patent No.: US 10,438,097 B2
(45) Date of Patent: Oct. 8, 2019

(54) RECOGNITION DEVICE, RECOGNITION METHOD, AND COMPUTER PROGRAM PRODUCT

(71) Applicants: KABUSHIKI KAISHA TOSHIBA, Minato-ku, Tokyo (JP); TOSHIBA DIGITAL SOLUTIONS CORPORATION, Kawasaki-shi, Kanagawa (JP)

(72) Inventor: Tomohisa Suzuki, Yokohama Kanagawa (JP)

(73) Assignees: KABUSHIKI KAISHA TOSHIBA, Tokyo (JP); TOSHIBA DIGITAL SOLUTIONS CORPORATION, Kawasaki-Shi (JP)

( * ) Notice: Subject to any disclaimer, the term of this patent is extended or adjusted under 35 U.S.C. 154(b) by 13 days.

(21) Appl. No.: 15/709,779

(22) Filed: Sep. 20, 2017

(65) Prior Publication Data
US 2018/0012112 A1 Jan. 11, 2018

Related U.S. Application Data

(63) Continuation of application No. PCT/JP2015/063526, filed on May 11, 2015.

(51) Int. Cl.
*G06K 9/72* (2006.01)
*G06K 9/62* (2006.01)
*G06K 9/68* (2006.01)

(52) U.S. Cl.
CPC ........... *G06K 9/723* (2013.01); *G06K 9/6204* (2013.01); *G06K 9/6277* (2013.01); *G06K 9/6885* (2013.01); *G06K 2209/01* (2013.01)

(58) Field of Classification Search
None
See application file for complete search history.

(56) References Cited

U.S. PATENT DOCUMENTS 5,835,722 A * 11/1998 Bradshaw ......... G06F 17/30867
709/225
6,246,794 B1 6/2001 Kagehiro et al.
(Continued)

FOREIGN PATENT DOCUMENTS

JP 55-140976 11/1980
JP 07-114622 5/1995
(Continued)

OTHER PUBLICATIONS

International Search Report for International Patent Application No. PCT/JP2015/063526 dated Jul. 21, 2015, 4 pages.
Written Opinion for International Patent Application No. PCT/JP2015/063526 dated Jul. 21, 2015, 4 pages.
(Continued)

*Primary Examiner* — Andrae S Allison
(74) *Attorney, Agent, or Firm* — Amin, Turocy & Watson LLP

(57) ABSTRACT

According to an embodiment, a recognition device includes a candidate detection unit, a recognition unit, a matching unit, and a prohibition processing unit. The candidate detection unit detects, from an input image, character candidates each being a set of pixels estimated to include a character. The recognition unit recognizes each of the character candidates and generates one or more recognition candidates each being a character of a candidate as a recognition result. The matching unit matches each of the one or more recognition candidates with a knowledge dictionary in which a recognition target character string is modeled, and generates matching results obtained by matching a character string estimated to be included in the input image with the knowledge dictionary. The prohibition processing unit deletes, from the matching results, a matching result obtained by matching a character string including a prohibition target character string with the knowledge dictionary.

10 Claims, 26 Drawing Sheets

(56) References Cited

U.S. PATENT DOCUMENTS

| | | | |
|---|---|---|---|
| 6,438,632 B1* | 8/2002 | Kikugawa | G06Q 10/107 709/204 |
| 2002/0087497 A1* | 7/2002 | Troianova | G06F 17/2785 706/45 |
| 2005/0268317 A1* | 12/2005 | Cormack | H04H 60/37 725/25 |
| 2006/0008148 A1* | 1/2006 | Mochizuki | G06K 9/348 382/182 |
| 2012/0072013 A1* | 3/2012 | Hamamura | G06K 9/346 700/224 |
| 2013/0073503 A1* | 3/2013 | Nagao | G10L 15/083 706/45 |
| 2013/0219483 A1* | 8/2013 | Cho | G06F 21/56 726/13 |
| 2014/0156272 A1* | 6/2014 | Sieger | G10L 15/26 704/235 |
| 2015/0161144 A1* | 6/2015 | Goto | G06F 17/3071 707/739 |
| 2017/0039194 A1* | 2/2017 | Tschetter | G16H 10/60 |

FOREIGN PATENT DOCUMENTS

| | | |
|---|---|---|
| JP | 07-152875 | 6/1995 |
| JP | 07-282203 | 10/1995 |
| JP | 09-185681 | 7/1997 |
| JP | 11-143893 | 5/1999 |
| JP | 4006176 | 11/2007 |

OTHER PUBLICATIONS

Marukawa, et al. "An Error Correction Algorithm for Handwritten Kanji Address Recognition", The Information Processing Society of Japan, vol. 35, No. 6, Jun. 15, 1994, pp. 1101-1110.

* cited by examiner

FIG.3

| ZIP CODE | 123-4567 | PHONE NUMBER | 890-1234-5678 |
|---|---|---|---|
| ADDRESS | CHISHIKISHORI-CHO, MOJININSHIKI-SHI, TOKYO | | |
| | 9-12-34 | | |
| NAME | 大林一郎 | | |

ORDER FORM

| PRODUCT CODE | PRODUCT NAME | QUANTITY | UNIT PRICE | AMOUNT |
|---|---|---|---|---|
| A00200 | BALLPOINT PEN | 20 | ¥1200 | ¥24000 |
| B00300 | ERASER | 10 | ¥800 | ¥8000 |
| | | | | |
| | | | | |
| | | | | |

INPUT IMAGE

| | ORDER FORM | | |
|---|---|---|---|
| ZIP CODE | 123-4567 | PHONE NUMBER | 890-1234-5678 |
| ADDRESS | CHISHIKISHORI-CHO, MOJININSHIKI-SHI, TOKYO | | |
| | 9-12-34 | | |
| NAME | 大林一郎 | | |

↓ EXTRACT AND BINARIZE

BINARY IMAGE

大林一郎

↓ LABELING

FRAGMENT

大 林 一 郎

↓ COMBINE AND GENERATE

CHARACTER CANDIDATE 0  2  4  6  8  10  ← CHARACTER CANDIDATE NUMBER

大 林 一 郎
 1     5     9

林 一 郎
 3     7

Lmax

FRAGMENT NUMBER  0  1  2  3  4  5

FIG.11

ENDING POINT NUMBER

|  | | 0 | 1 | 2 | 3 | 4 | 5 | 6 |
|---|---|---|---|---|---|---|---|---|
| STARTING POINT NUMBER | 0 | -1 | 0 | 1 | -1 | -1 | -1 | -1 |
| | 1 | -1 | -1 | 2 | 3 | -1 | -1 | -1 |
| | 2 | -1 | -1 | -1 | 4 | 5 | -1 | -1 |
| | 3 | -1 | -1 | -1 | -1 | 6 | 7 | -1 |
| | 4 | -1 | -1 | -1 | -1 | -1 | 8 | 9 |
| | 5 | -1 | -1 | -1 | -1 | -1 | -1 | 10 |

FIG.26

| SYMBOL | DESCRIPTION | EXAMPLE |
|---|---|---|
| N | NUMBERS FROM 1 TO 9 | 123456789 |
| n | NUMBERS FROM 0 TO 9 | 0123456789 |
| - | HYPHEN | - |
| M | CHARACTER USED FOR NAME OF CONDOMINIUM, NAME OF APARTMENT HOUSE, OR NAME OF BUILDING | CHARACTER OTHER THAN NUMBER AND HYPHEN |

FIG.27

N-N-N
N-N-Nn
N-N-Nn n
N-Nn-Nn
N-Nn-Nn n
N-Nn n
N-Nn n n
N-N-NMMM
N-N-NMMMM
N-N-NMMMMM
N-N-NMMMMMM
N-N-NMMMMMMM

| MATCHING RESULT DATA | | | | |
|---|---|---|---|---|
| POSITION NUMBER | | s | c | w |
| 0 | NUMBER OF MATCHING RESULTS | 0,<br>0,<br>0,<br>0,<br>⋮ | 0,<br>0,<br>0,<br>0, | N-N-N<br>N-N-Nn<br>N-N-Nn n<br>N-Nn-Nn |
| 1 | NUMBER OF MATCHING RESULTS | 99,<br>90,<br>80,<br>80,<br>⋮ | 1,<br>1,<br>1,<br>1, | 9-N-N<br>9-N-Nn<br>7-N-N<br>7-N-Nn |
| 2 | NUMBER OF MATCHING RESULTS | 179,<br>179,<br>160,<br>160,<br>⋮ | 2,<br>2,<br>2,<br>2, | 9-N-N<br>9-N-Nn<br>7-N-N<br>7-N-Nn |

RECOGNITION DEVICE, RECOGNITION METHOD, AND COMPUTER PROGRAM PRODUCT

CROSS-REFERENCE TO RELATED APPLICATIONS

This application is a continuation of PCT international application Ser. No. PCT/JP2015/063526 filed on May 11, 2015 which designates the United States, the entire contents of which are incorporated herein by reference.

FIELD

Embodiments described herein relate generally to a recognition device, a recognition method, and a computer program product.

BACKGROUND

As a method of performing knowledge processing in character recognition, known is a method of modeling a recognition target character string to be stored in a knowledge dictionary, and causing a character string matching with the model to be a result of the knowledge dictionary. For example, known is a system that includes a word dictionary part in which a word to be matched is registered, and a word matching unit including a finite automaton that accepts the word registered in the word dictionary part, and outputs the word accepted by the finite automaton as a result of knowledge processing (for example, refer to Japanese Patent Application Laid-open No. H11-143893). There is also known a technique of performing knowledge processing by matching place name notation described using context-free grammar with a character recognition candidate (for example, refer to Japanese Patent No. 4006176).

BRIEF DESCRIPTION OF THE DRAWINGS

FIG. 3 is a diagram illustrating an example of an input image;

FIG. 11 is a diagram illustrating an example of a character candidate matrix;

FIG. 26 is a diagram illustrating an example of characters used as a recognition result in the recognition device 10 according to a modification, and a symbol representing classification of the characters;

FIG. 27 is a diagram illustrating an example of content of the knowledge dictionary in which a character string recognized by the recognition device 10 according to the modification is represented as a string of symbols representing classification of the characters;

FIG. 28 is a diagram illustrating an example of matching result data according to the modification.

DETAILED DESCRIPTION

According to an embodiment, a recognition device includes a candidate detection unit, a recognition unit, a matching unit, and a prohibition processing unit. The candidate detection unit is configured to detect, from an input image, character candidates each of which is a set of pixels estimated to include a character. The recognition unit is configured to recognize each of the character candidates and generate one or more recognition candidates each of which is a character of a candidate as a recognition result. The matching unit is configured to match each of the one or more recognition candidates with a knowledge dictionary in which a recognition target character string is modeled, and generate matching results obtained by matching a character string estimated to be included in the input image with the knowledge dictionary. The prohibition processing unit is configured to delete, from the matching results, a matching result obtained by matching a character string including a prohibition target character string with the knowledge dictionary.

Figure 1:
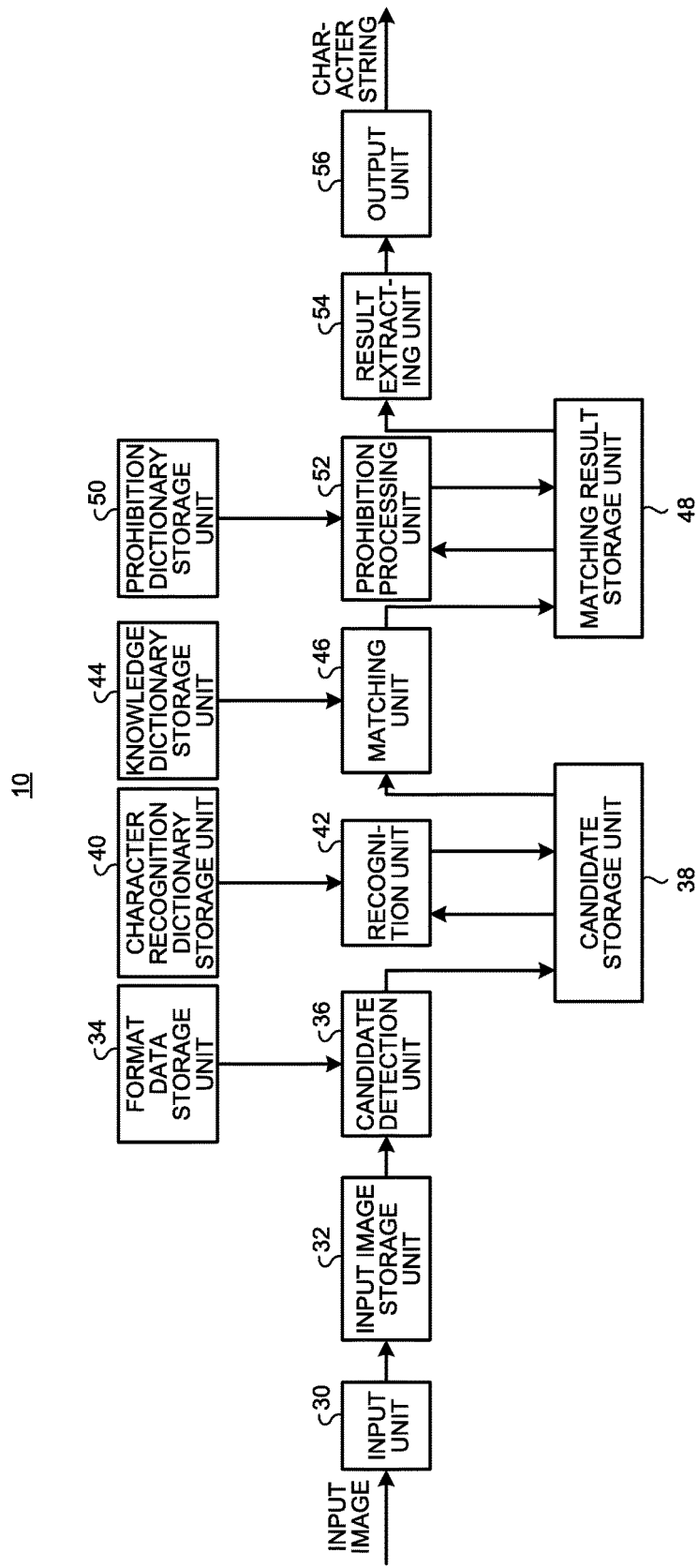
FIG. 1 is a diagram illustrating a configuration of a recognition device 10 according to an embodiment.

FIG. 1 is a diagram illustrating a configuration of a recognition device 10 according to an embodiment. The recognition device 10 recognizes a character string included in an input image read by a scanner and the like, for example, and outputs the recognized character string.

The recognition device 10 includes an input unit 30, an input image storage unit 32, a format data storage unit 34, a candidate detection unit 36, a candidate storage unit 38, a character recognition dictionary storage unit 40, a recognition unit 42, a knowledge dictionary storage unit 44, a matching unit 46, a matching result storage unit 48, a prohibition dictionary storage unit 50, a prohibition processing unit 52, a result extracting unit 54, and an output unit 56.

The input unit 30 receives an input image captured by a scanner and the like. The input unit 30 may receive an input image from another computer via a network and the like. The input image storage unit 32 stores the input image received by the input unit 30.

The format data storage unit 34 stores therein format data that specifies a region in which a character string is described in the input image.

The candidate detection unit 36 detects character candidates from the input image based on the format data stored in the format data storage unit 34. Each character candidate is a set of pixels estimated to include one character. The candidate detection unit 36 writes the detected character candidates in the candidate storage unit 38.

The candidate storage unit 38 stores therein the character candidates. The candidate storage unit 38 also stores therein, corresponding to each character candidate, a recognition candidate which is a character of a candidate as a recognition result of the character candidate.

The character recognition dictionary storage unit 40 stores therein a character recognition dictionary. The character recognition dictionary stores therein information for calculating similarity between a recognition target image and each of characters registered in advance.

The recognition unit 42 recognizes each of the character candidates stored in the candidate storage unit 38 based on the character recognition dictionary stored in the character recognition dictionary storage unit 40. The recognition unit 42 generates one or more recognition candidates, each of which is a character of a candidate as a recognition result for one character candidate. The recognition unit 42 stores, in the candidate storage unit 38, the generated one or more recognition candidates in an associated manner with the character candidate.

The knowledge dictionary storage unit 44 stores therein a knowledge dictionary in which a recognition target character string is modeled. In the present embodiment, the knowledge dictionary is a deterministic finite automaton in which the recognition target character string is modeled.

The matching unit 46 matches each of one or more recognition candidates with the knowledge dictionary to generate on or more matching results obtained by matching the character string estimated to be included in the input image with the knowledge dictionary. In this process, the matching unit 46 generates one or more matching results including a score representing likelihood of a corresponding character string. The matching unit 46 then writes the generated one or more matching results in the matching result storage unit 48.

The matching result storage unit 48 stores therein one or more matching results generated by the matching unit 46. The matching result storage unit 48 stores therein matching results at a start point, an intermediate stage, and a completion point in a process of matching a character string obtained by arranging recognition candidates of character candidates with the knowledge dictionary from the head. The matching unit 46 may delete, in the intermediate stage of matching, a matching result having a low score so as to save a storage area.

The prohibition dictionary storage unit 50 stores therein a prohibition dictionary in which a prohibition target character string is modeled. In the present embodiment, the prohibition dictionary is a deterministic finite automaton in which the prohibition target character string is modeled.

The prohibition processing unit 52 deletes, from one or more matching results, a matching result obtained by matching a character string including the prohibition target character string with the knowledge dictionary. In the present embodiment, the prohibition processing unit 52 matches each character string specified based on the matching result with the prohibition dictionary as a deterministic finite automaton, and when the character string is accepted by the deterministic finite automaton of the prohibition dictionary, the prohibition processing unit 52 deletes a corresponding matching result.

When a matching result obtained by matching the character string including the prohibition target character string with the knowledge dictionary is generated in the intermediate stage of matching performed by the matching unit 46, the prohibition processing unit 52 may delete the matching result of the intermediate stage. Alternatively, the prohibition processing unit 52 may match whether each of a plurality of matching results includes the prohibition target character string after matching performed by the matching unit 46 is completed, and may delete the matching result obtained by matching the character string including the prohibition target character string with the knowledge dictionary.

After matching performed by the matching unit 46 and deletion performed by the prohibition processing unit 52 are completed, the result extracting unit 54 selects one or more matching results from one or more matching results stored in the matching result storage unit 48 based on a score, and extracts a character string specified by the selected one or more matching results. By way of example, the result extracting unit 54 extracts the character string specified by the matching result having the best score.

The output unit 56 outputs the character string extracted by the result extracting unit 54 to the outside.

Figure 2:
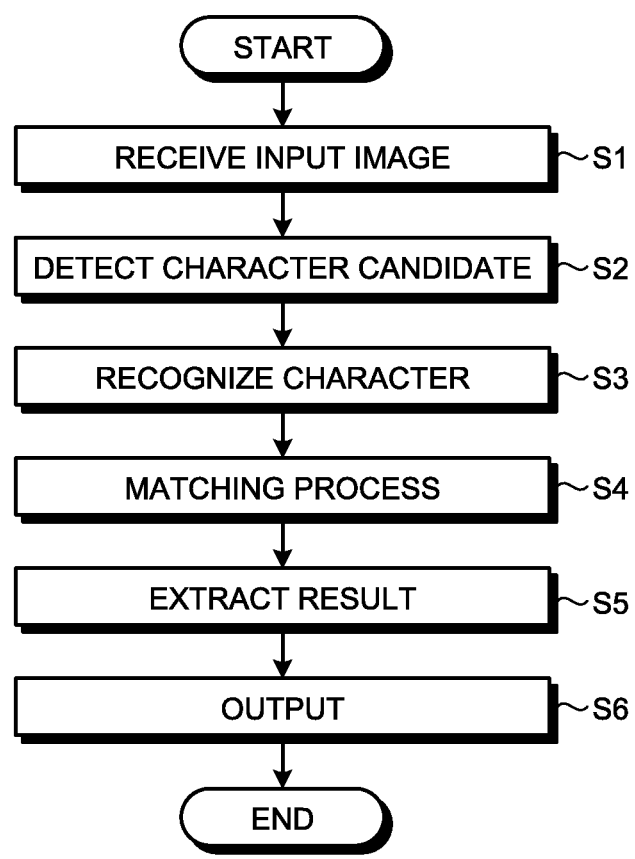
FIG. 2 is a flowchart illustrating processing of the recognition device 10 according to the embodiment.

FIG. 2 is a flowchart illustrating processing of the recognition device 10 according to the embodiment. First, at Step S1, the recognition device 10 receives an input image.

Subsequently, at Step S2, the recognition device 10 detects, from the input image, character candidates, each of which is a set of pixels estimated to include one character. At Step S3, the recognition device 10 recognizes each character candidate based on the character recognition dictionary, and generates one or more recognition candidates each of which is a character of a candidate as a recognition result.

Subsequently, at Step S4, the recognition device 10 matches each of one or more recognition candidates with the knowledge dictionary, and generates one or more matching results obtained by matching the character string estimated to be included in the input image with the knowledge dictionary. At the same time, at Step S4, the recognition device 10 matches each character string specified by the matching result with the prohibition dictionary, and deletes the matching result obtained by matching the character string accepted by the deterministic finite automaton of the prohibition dictionary with the knowledge dictionary.

Subsequently, at Step S5, the recognition device 10 selects one matching result from matching results based on the score after matching process is completed, and extracts a character string specified by the selected matching result to be a character string as a recognition result. When the number of character candidates is 0, that is, the input image does not include a character, the matching result to be selected at Step S5 is not generated. In this case, the character string as a recognition result is set to be an empty string. Finally, at Step S6, the recognition device 10 outputs the character string as a recognition result.

FIG. 3 is a diagram illustrating an example of the input image. In the present embodiment, as illustrated in FIG. 3, the input image is image data obtained by capturing an order form for ordering a product with a scanner and the like. A name of an orderer is written within a predetermined entry frame of the input image. In the present embodiment, the recognition device 10 recognizes a character string of a Japanese name written within the predetermined entry frame, and outputs text data representing the recognized character string.

Figure 4:
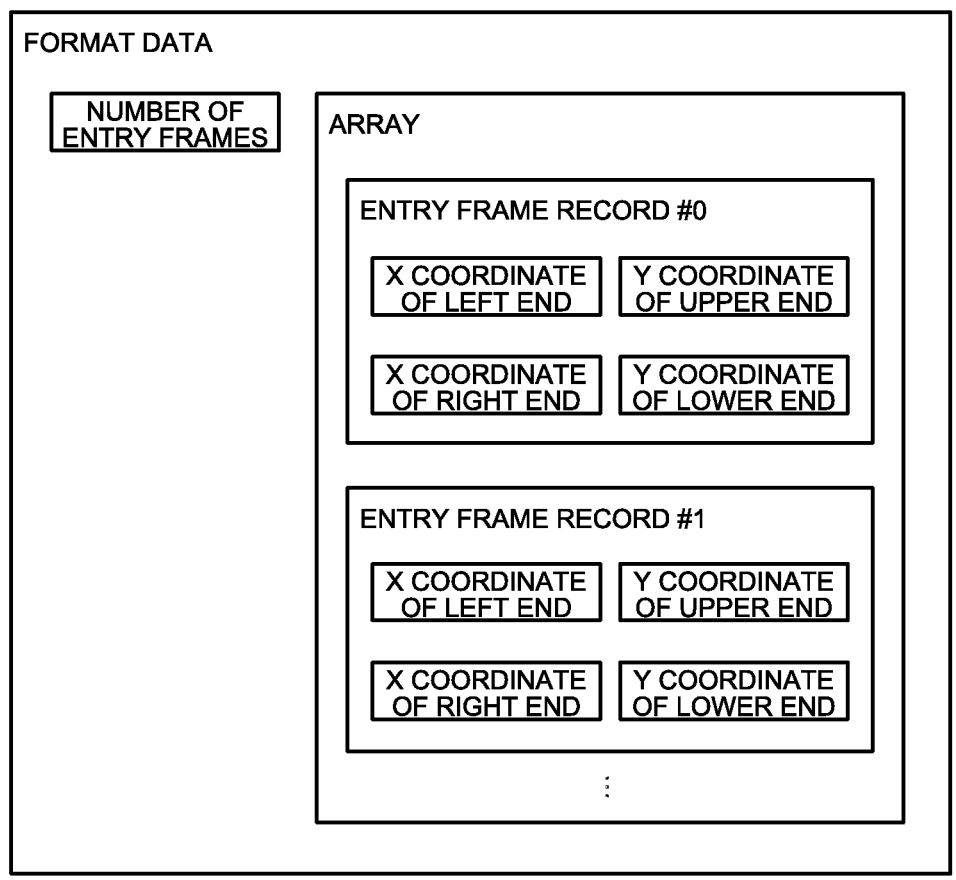
FIG. 4 is a diagram illustrating a configuration of a format data.

FIG. 4 is a diagram illustrating a configuration of the format data. The format data storage unit 34 stores therein format data created in advance.

As illustrated in FIG. 4, the format data includes a value indicating the number of entry frames included in the input image and includes an array that stores entry frame records corresponding to the number of entry frames. In this example, an index of the first entry in the array is 0. That is, the array is zero-origin. Other arrays used in the present embodiment are also zero-origin unless otherwise specifically noted. The entry frame records correspond to the entry frames included in the input image on a one to one basis.

Each entry frame record includes information indicating a position of the corresponding entry frame in the input image. In this example, the information indicating the position of the entry frame is X-coordinates of left and right ends (coordinates in a horizontal direction) and Y-coordinates of upper and lower ends (coordinates in a vertical direction) of the corresponding entry frame.

Figure 5:
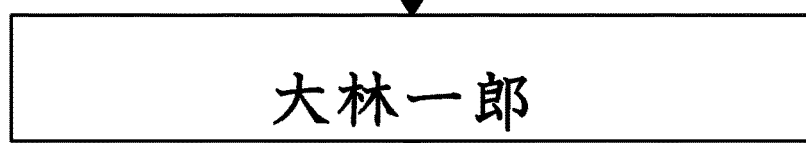
FIG. 5 is a diagram illustrating processing of generating a series of character candidates from the input image.

FIG. 5 is a diagram illustrating a process of generating a series of character candidates from the input image. The candidate detection unit 36 specifies a region of the entry frame based on the information indicated by the entry frame record (for example, a region enclosed by a dotted line in FIG. 5), and extracts a partial region image from the specified region. Subsequently, the candidate detection unit 36 binarizes the extracted partial region image to generate a binary image. The candidate detection unit 36 then extracts connection components of black pixels on the binary image, and labels each of the connection components. Each of the labeled connection components is an element constituting a character, and is called a fragment. Subsequently, the candidate detection unit 36 generates a character candidate by combining one or more fragments that are continuously arranged. The character candidate is a set of pixels estimated to represent one character.

Figure 6:
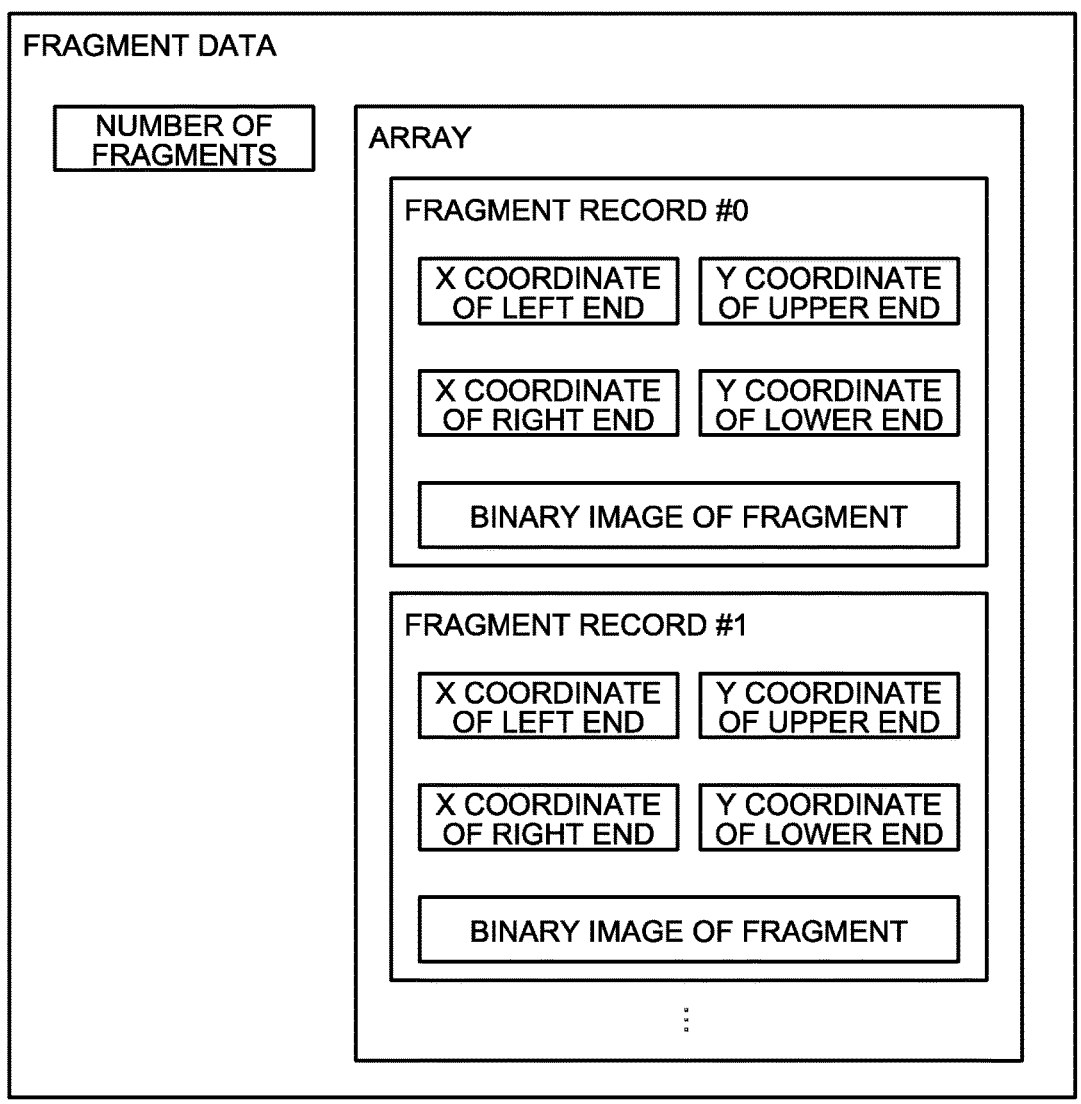
FIG. 6 is a diagram illustrating a configuration of fragment data.

FIG. 6 is a diagram illustrating a configuration of fragment data. The candidate storage unit 38 stores therein the fragment data representing the fragments. As illustrated in FIG. 6, the fragment data includes a value indicating the number of fragments and includes an array that stores fragment records corresponding to the number of fragments. The fragment records correspond to the fragments on a one to one basis.

Each fragment record includes information indicating a position of a corresponding fragment and a binary image representing the shape of the fragment. In this example, the information indicating the position of the fragment includes the X-coordinates of left and right ends and the Y-coordinates of upper and lower ends of the corresponding fragment, and indicates a circumscribed rectangle of the fragment. The binary image representing the shape of the fragment is an image in which pixels on the connection components are caused to be black pixels and the other pixels are caused to be white pixels within the circumscribed rectangle of the fragment.

The candidate detection unit 36 calculates the X-coordinate of the center and the Y-coordinate of the center for each fragment. The X-coordinate of the center is an average value of the X-coordinates of the left and right ends. The Y-coordinate of the center is an average value of the Y-coordinates of the upper and lower ends. The candidate detection unit 36 then aligns a plurality of fragment records in the array in ascending order of the X-coordinate of the center. Accordingly, the candidate detection unit 36 can align the fragment records in the array along a character entry direction in the entry frame (in this example, a direction from the left toward the right).

Figure 7:
FIG. 7 is a diagram illustrating an example of a fragment number.

FIG. 7 is a diagram illustrating an example of a fragment number. Each fragment record is identified by an index of the array. An index after the fragment records are aligned in the character entry direction is called a fragment number. Thus, each fragment is associated with a corresponding fragment number as illustrated in FIG. 7.

Figure 8:
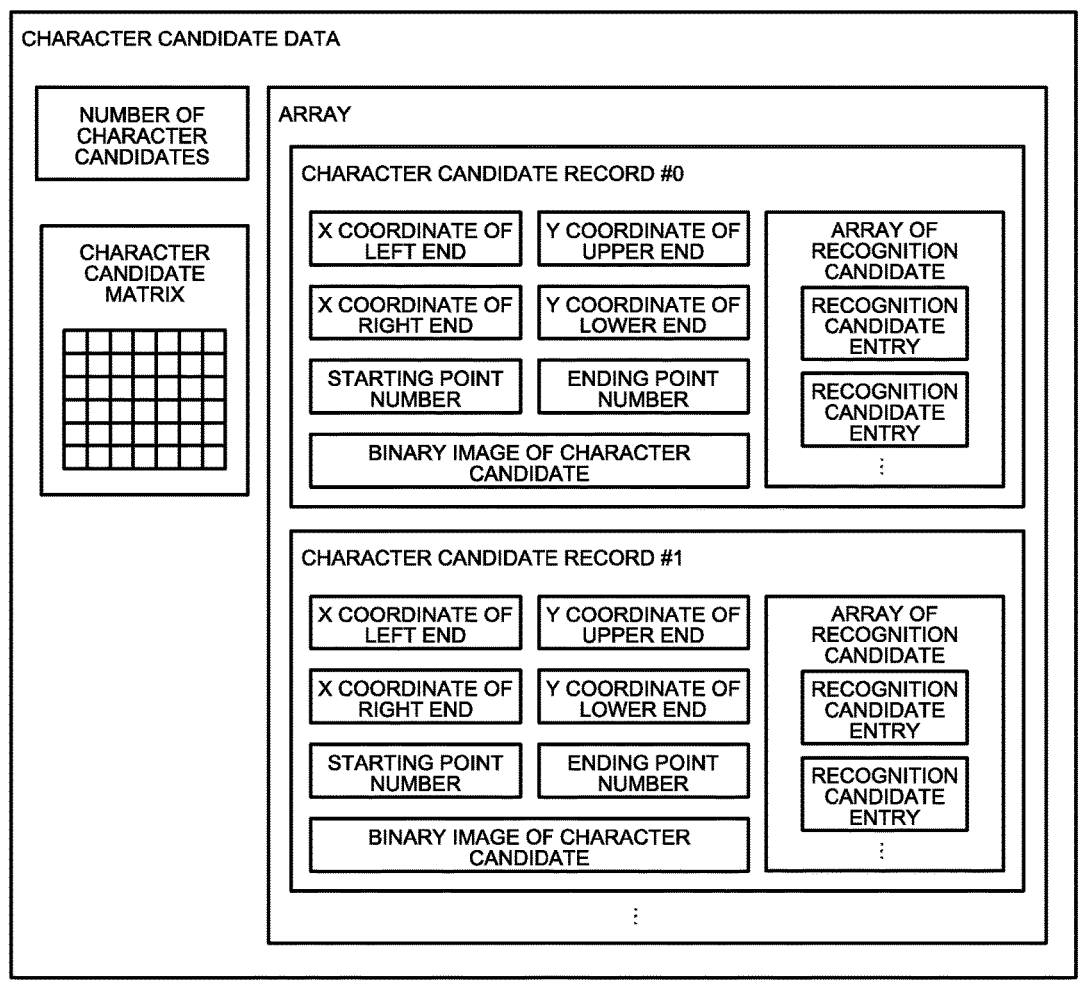
FIG. 8 is a diagram illustrating a configuration of character candidate data.

FIG. 8 is a diagram illustrating a configuration of character candidate data. The candidate detection unit 36 generates character candidates by combining one or more fragments that are continuously arranged. In this process, the candidate detection unit 36 generates character candidates by combining one or more fragments in every pattern in which a breadth L of the circumscribed rectangle is equal to or smaller than a predetermined length (Lmax).

The candidate storage unit 38 stores therein the character candidate data representing the character candidates. As illustrated in FIG. 8, the character candidate data includes a value indicating the number of generated character candidates, a character candidate matrix (details will be described later), and an array storing character candidate records corresponding to the number of character candidates. The character candidate records correspond to the character candidates on a one to one basis.

Each character candidate record includes information indicating a position of a corresponding character candidate, a starting point number and an ending point number (details will be described later) of the corresponding character candidate, a binary image representing the shape of the character candidate, and a recognition candidate array including a recognition candidate entry (details will be described later). In this example, the information indicating the position of the character candidate is the X-coordinates of the left and right ends and the Y-coordinates of the upper and lower ends of the corresponding character candidate, and indicates a circumscribed rectangle of the character candidate on the binary image. The binary image representing the shape of the character candidate is an image in which pixels on the character candidate are caused to be black pixels and the other pixels are caused to be white pixels within the circumscribed rectangle of the character candidate. A value of the recognition candidate entry is set by the recognition unit 42, and the value is not set by the candidate detection unit 36.

Figure 9:
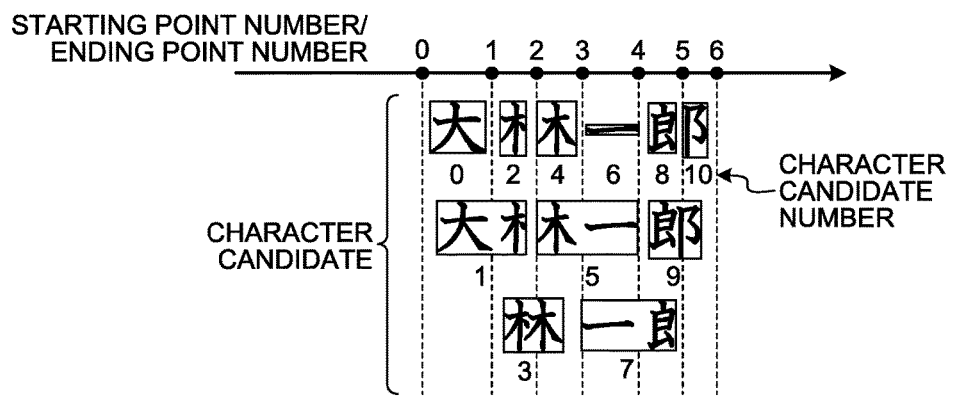
FIG. 9 is a diagram illustrating an example of a character candidate number.

FIG. 9 is a diagram illustrating an example of a character candidate number. Each character candidate record is identified by an index of the array. The index of the character candidate record is called a character candidate number. Thus, as illustrated in FIG. 9, each character candidate is associated with a corresponding character candidate number.

Figure 10:
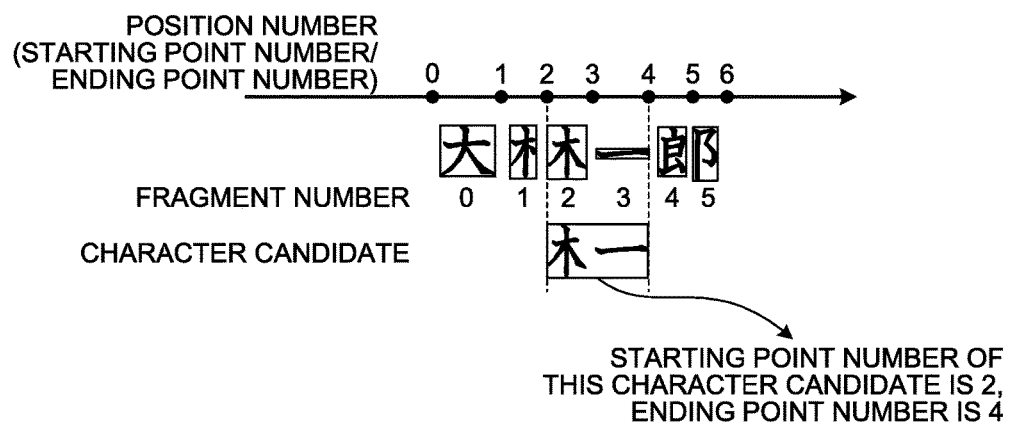
FIG. 10 is a diagram illustrating an example of a starting point number and an ending point number of a character candidate.

FIG. 10 is a diagram illustrating an example of the starting point number and the ending point number of the character candidate. The character candidate is generated by combining one or more fragments that are continuously arranged. Thus, the character candidate can be uniquely identified by a set of a fragment number of the first fragment in an original arrangement of one or more fragments and a value obtained by adding 1 to a fragment number of the last fragment.

In the present embodiment, the fragment number of the first fragment is called the starting point number of the character candidate, and the value obtained by adding 1 to the fragment number of the last fragment is called the ending point number of the character candidate. Thus, as illustrated in FIG. 10, each character candidate is associated with its starting point number and ending point number. The starting point number and the ending point number represent separating positions of the character candidate, so that both of the starting point number and the ending point number are also collectively called position numbers.

FIG. 11 is a diagram illustrating an example of the character candidate matrix. As illustrated in FIG. 11, the character candidate matrix is a two-dimensional array of character candidate numbers in which the starting point number is the first index and the ending point number is the second index. The character candidate matrix is initialized by setting all entries to be −1 before the character candidate record is generated. The candidate detection unit 36 writes the character candidate number in a corresponding entry of the character candidate matrix every time the character candidate is created.

Figure 12:
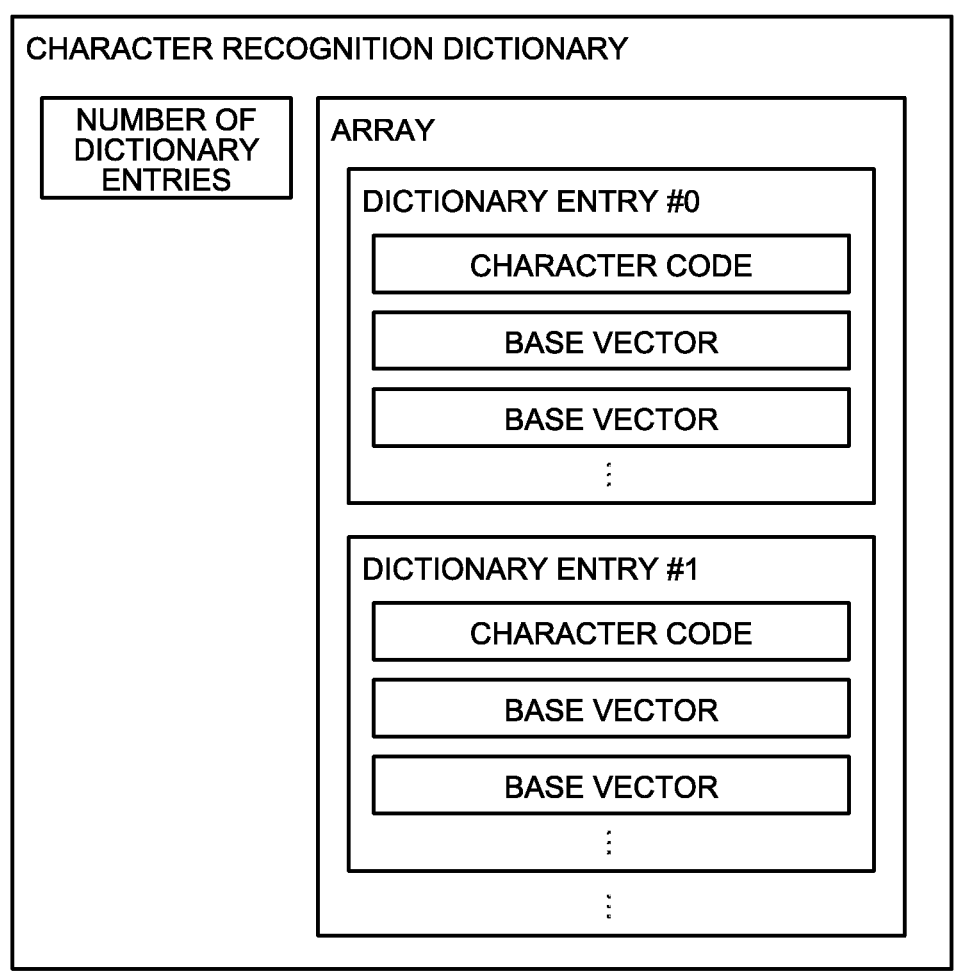
FIG. 12 is a diagram illustrating a configuration of a character recognition dictionary.

FIG. 12 is a diagram illustrating a configuration of the character recognition dictionary. The character recognition dictionary storage unit 40 stores therein the character recognition dictionary that is created in advance. As illustrated in FIG. 12, the character recognition dictionary includes a value indicating the number of dictionary entries and includes an array that stores the dictionary entries.

Each dictionary entry includes a character code and $D_{sub}$ base vectors determined in advance. The base vector is a feature vector of a subspace representing a character corresponding to the character code. By way of example, the feature vector is calculated by dividing a binary image of a corresponding character into a predetermined optional number of pieces in a vertical direction and a horizontal direction, obtaining a ratio of the number of black pixels in each of divided regions, and causing a series of obtained ratios to be elements of the feature vector.

Figure 13:
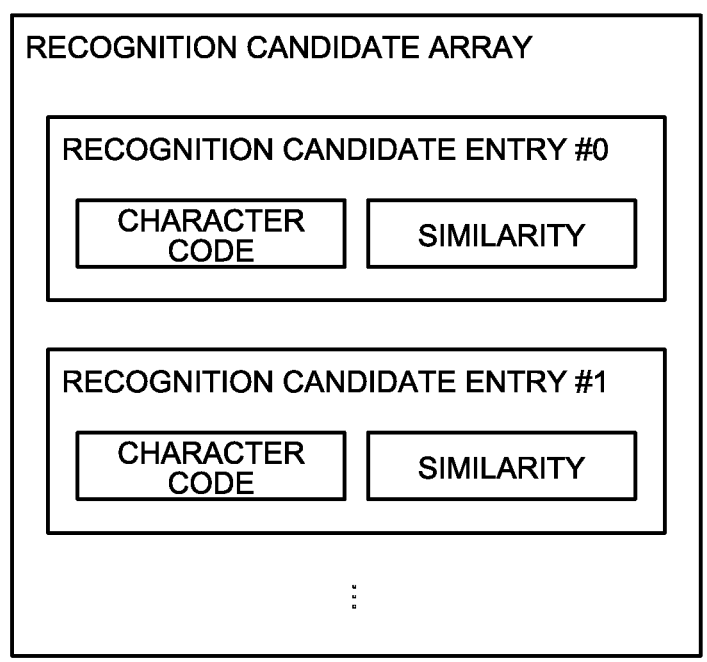
FIG. 13 is a diagram illustrating a configuration of a recognition candidate array.

FIG. 13 is a diagram illustrating a configuration of the recognition candidate array. As illustrated in FIG. 13, the recognition candidate array stored in the character candidate record includes $N_{cand}$ recognition candidate entries determined in advance. Each recognition candidate entry includes a character code and similarity.

The recognition unit 42 performs character recognition on each character candidate, and generates one or more recognition candidates each of which is a character of a candidate as a recognition result. In the present embodiment, the recognition unit 42 generates predetermined $N_{cand}$ recognition candidate entries for each character candidate record, and writes the recognition candidate entries in the recognition candidate array.

More specifically, the recognition unit 42 extracts the feature vector from the binary image included in a corresponding character candidate record, and matches the feature vector with the base vector stored in each dictionary entry of the character recognition dictionary using a subspace method to calculate the similarity. The recognition unit 42 extracts the character code stored in the dictionary entry for each of $N_{cand}$ dictionary entries having higher similarity, and generates the recognition candidate entry including the extracted character code and the calculated similarity. The recognition unit 42 writes the generated $N_{cand}$ recognition candidate entries in the recognition candidate array of the corresponding character candidate record. Additionally, the recognition unit 42 aligns the recognition candidate entries included in the recognition candidate array of each character candidate record in descending order of similarity.

Figure 14:
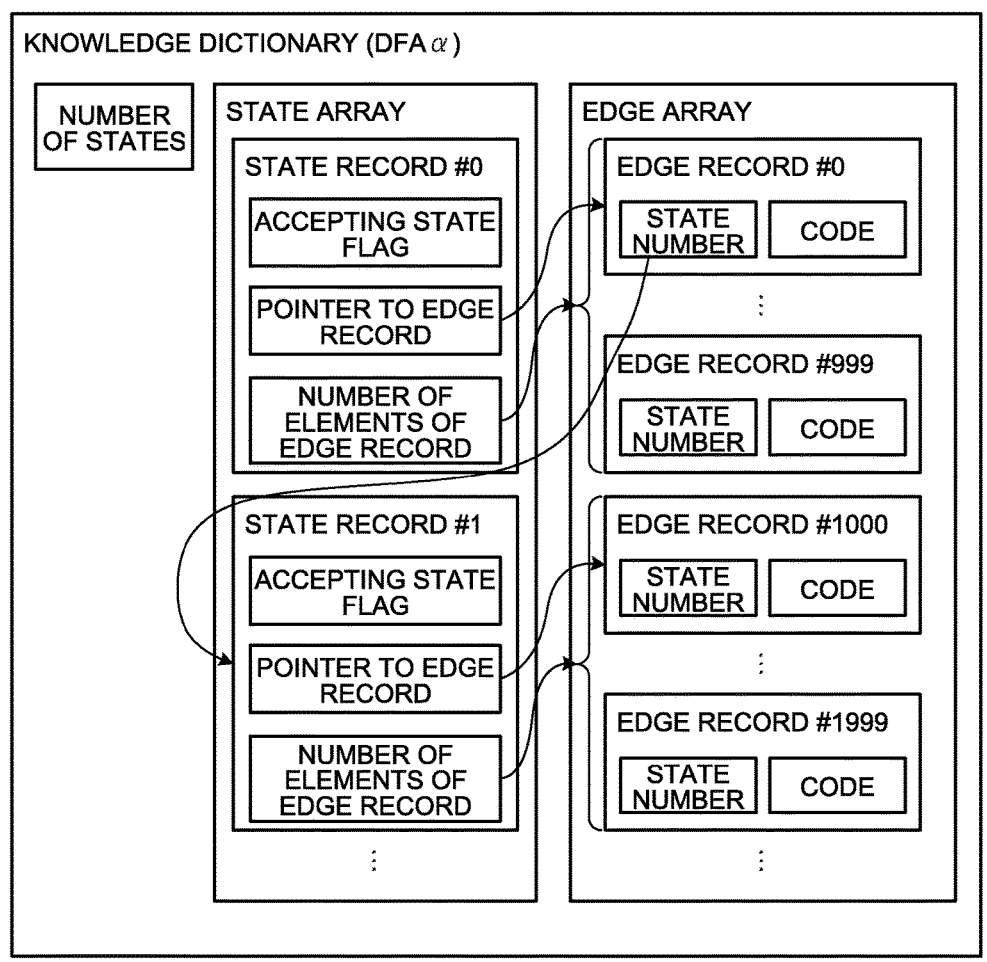
FIG. 14 is a diagram illustrating a configuration of a knowledge dictionary.

FIG. 14 is a diagram illustrating a configuration of the knowledge dictionary. The knowledge dictionary storage unit 44 stores therein the knowledge dictionary that is created in advance by a designer and the like.

In the present embodiment, the knowledge dictionary is a deterministic finite automaton in which a recognition target character string is modeled. In the present embodiment, the knowledge dictionary as a deterministic finite automaton is also called DFAα. For example, DFAα is generated as follows. A designer describes a recognition target character string by a regular expression, and the regular expression is converted into a deterministic finite automaton.

As illustrated in FIG. 14, DFAα includes a value indicating the number of states, a state array that stores state records corresponding to the number of states, and an edge array that stores edge records corresponding to the number of edges.

The state records correspond to the states included in DFAα on a one to one basis, and the state is uniquely identified by a number of the state record, that is, a state number. The state array is zero-origin, so that a state having the state number of 0 is a start state. Each state record includes an accepting state flag, a pointer to the edge record in the edge array, and the number of elements of the edge record.

The accepting state flag indicates whether the state is the accepting state. By way of example, the accepting state flag of 1 indicates the state is the accepting state, and the accepting state flag of 0 indicates the state is not the accepting state.

The pointer to the edge record indicates a storage position of a set of edges leaving the state within the edge array. The number of elements of the edge record indicates the number of edges leaving the state. With the pointer to the edge record and the number of elements, the edge record corresponding to all edges leaving the state can be specified.

The edge records correspond to the edges included in DFAα on a one to one basis. Each edge record includes a state number of a transition destination and a code.

The state number of the transition destination represents a state number that specifies a state of the transition destination represented by the edge.

The code represents an input symbol that causes transition represented by the edge. In the present embodiment, the code stores a character code representing a character. Thus, in DFAα, transition from a certain state to another state is caused by the character code representing a character as a recognition candidate.

Figure 15:
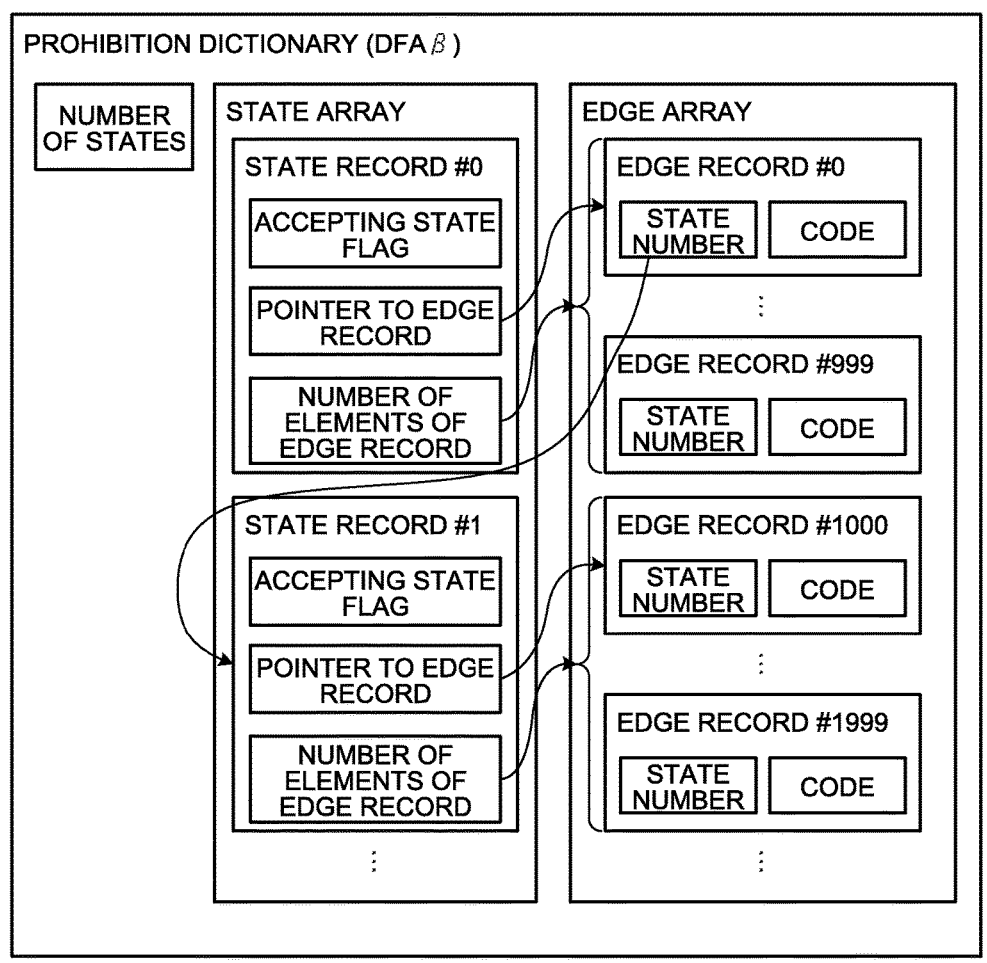
FIG. 15 is a diagram illustrating a configuration of a prohibition dictionary.

FIG. 15 is a diagram illustrating a configuration of the prohibition dictionary. The prohibition dictionary storage unit 50 stores therein the prohibition dictionary that is created in advance by a designer and the like.

In the present embodiment, the prohibition dictionary is a deterministic finite automaton in which a prohibition target character string is modeled. The prohibition target character string is a character string prohibited from being input, a character string that cannot be input, an unnatural character string, and the like. For example, the prohibition target character string is defined by a designer. In the present embodiment, the prohibition dictionary as a deterministic finite automaton is also called DFAβ.

As illustrated in FIG. 15, DFAβ includes a value indicating the number of states, the state array that stores state records corresponding to the number of states, and the edge array that stores edge records corresponding to the number of edges. Respective elements constituting the prohibition dictionary are the same as those of the knowledge dictionary (DFAα) illustrated in FIG. 14, so that a detailed description thereof will be omitted.

DFAβ is obtained as follows. A designer describes (models) the prohibition target character string by the regular expression; the regular expression is converted into a first non-deterministic finite automaton; the first non-deterministic finite automaton is converted into a second non-deterministic finite automaton; and the second non-deterministic finite automaton is converted into a deterministic finite automaton.

Figure 16:
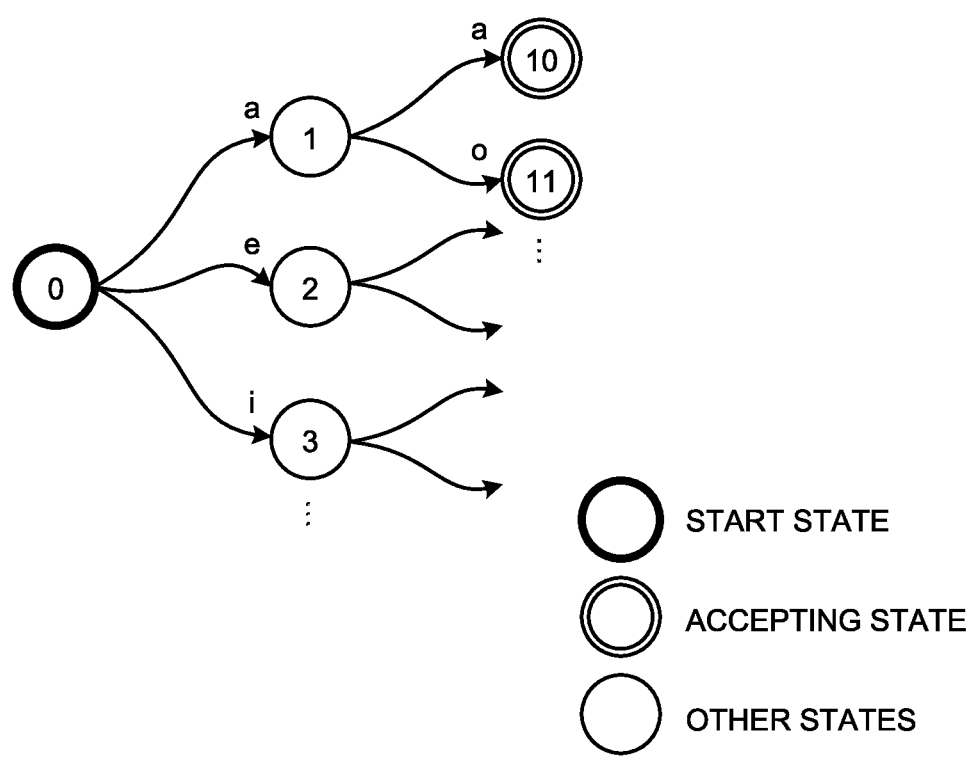
FIG. 16 is a diagram illustrating an example of a first non-deterministic finite automaton.
Figure 17:
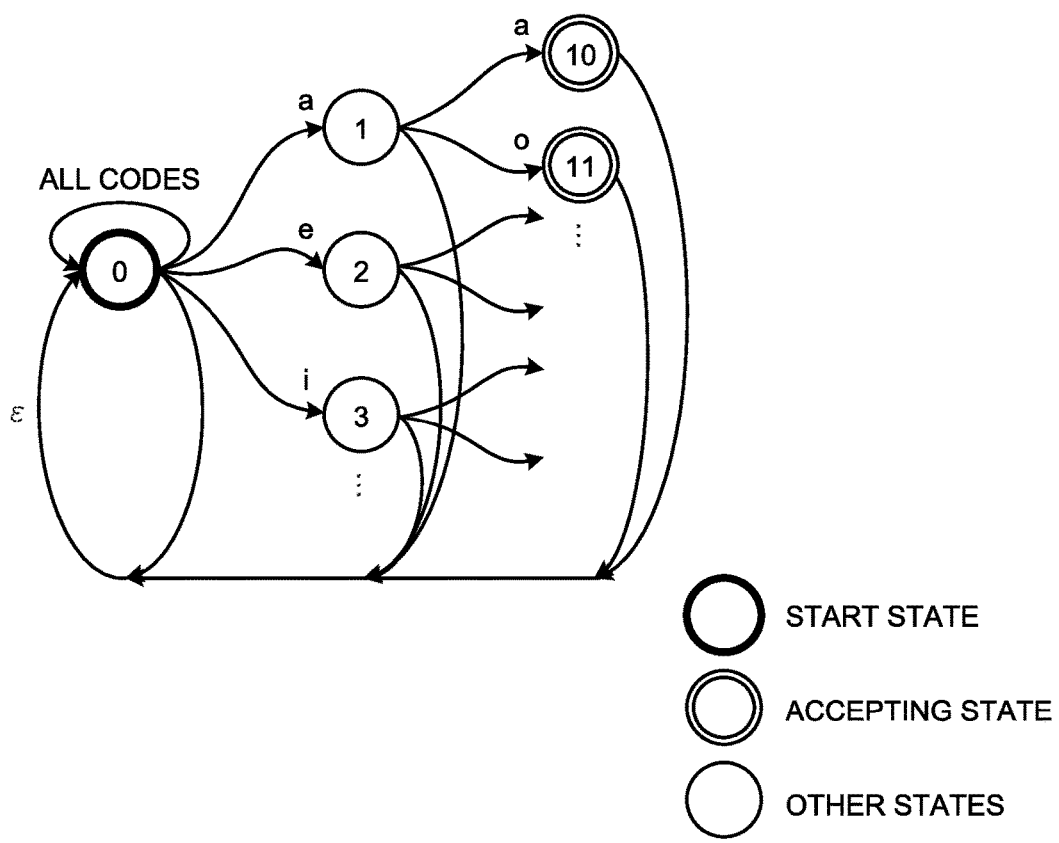
FIG. 17 is a diagram illustrating an example of a second non-deterministic finite automaton that is obtained by converting the first non-deterministic finite automaton.

FIG. 16 is a diagram illustrating an example of the first non-deterministic finite automaton. FIG. 17 is a diagram illustrating an example of the second non-deterministic finite automaton that is obtained by converting the first non-deterministic finite automaton. In the automaton illustrated in FIG. 16, an input symbol string on a path from the start state to the accepting state represents the prohibition target character string.

The second non-deterministic finite automaton is obtained by converting the first non-deterministic finite automaton as illustrated in FIG. 16 through a procedure as described below. First, to the first non-deterministic finite automaton, added is an edge of a self-loop returned from the start state to the start state, to which all characters (codes) are assigned as input symbols. Subsequently, by adding an empty edge (ε transition) to the automaton to which the self-loop is added, the empty edge being returned to the start state from each of all states except the start state and to which an empty symbol ε is assigned as an input symbol, the second non-deterministic finite automaton as illustrated in FIG. 17 is obtained.

That is, in the second non-deterministic finite automaton, as illustrated in FIG. 17, the input symbol string on the path from the start state to the accepting state represents the prohibition target character string. Additionally, the second non-deterministic finite automaton includes the edge of the self-loop that is returned to the start state from the start state and to which all characters are assigned as input symbols, and the empty edge that is returned to the start state from each of all states except the start state and to which the empty symbol is assigned as an input symbol.

In DFAβ obtained by converting the second non-deterministic finite automaton configured as described above into the deterministic finite automaton, the prohibition target character string is modeled. DFAβ is configured to securely transition to the accepting state when a character string including the prohibition target character string is received.

A method of generating the non-deterministic finite automaton or the deterministic finite automaton from the regular expression, and a method of generating the deterministic finite automaton from the non-deterministic finite automaton are described in A. V. Aho, R. Sethi, J. D. Ullman, Kenichi Harada (translation), Compiler I, first edition 1986, pp. 134-172, for example.

Figure 18:
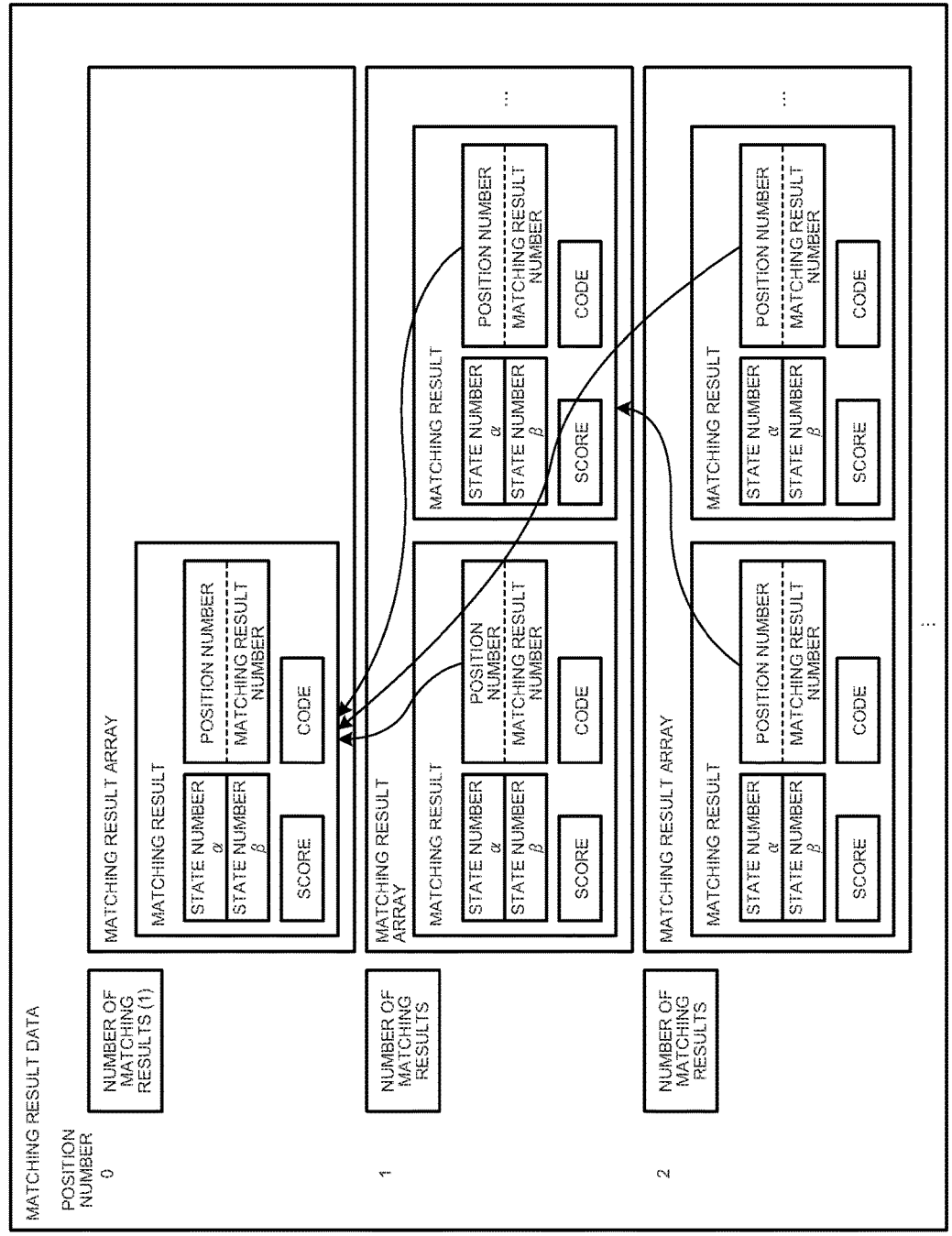
FIG. 18 is a diagram illustrating a configuration of matching result data.

FIG. 18 is a diagram illustrating a configuration of matching result data. The matching unit 46 sequentially matches the recognition candidates included in the character candidate with the knowledge dictionary from the head, and generates a matching result obtained by matching a character string estimated to be written within the entry frame of the input image with the knowledge dictionary. The matching unit 46 writes the generated matching result in the matching result storage unit 48. At the same time, the prohibition processing unit 52 matches the character string specified by the matching result with the prohibition dictionary, and deletes, from the matching result storage unit 48, a matching result representing a character string accepted by the deterministic finite automaton of the prohibition dictionary.

The matching result storage unit 48 stores therein the matching result data. The matching result data includes the number of matching results and a matching result array for each position number.

The number of matching results represents the number of matching results associated with the corresponding position number. The matching result array stores the matching result(s) associated with the corresponding position number. Each matching result includes a state number α, a state number β, a score, a code, and a pair of the position number and the matching result number. Each matching result is uniquely identified by a pair of a position number associated with an array of a storage destination and a number as an array element in the array of the storage destination. In the following description, the position number associated with the array of the storage destination of the matching result is referred to as a "position number associated with the matching result", and the number as an array element in the array of the storage destination of the matching result is referred to as a "matching result number".

The state number α represents a state of the knowledge dictionary (DFAα). That is, the state number α indicates a state reached by DFAα when DFAα is caused to sequentially transition from the start state in accordance with each character from the head recognition candidate to the recognition candidate at the corresponding position.

The state number β represents a state of the prohibition dictionary (DFAβ). That is, the state number β indicates a state reached by DFAβ when DFAβ is caused to sequentially transition from the start state in accordance with each character included in the character string specified by the corresponding matching result.

The score represents a value obtained by accumulating similarity associated with recognition candidates, that is, from the head recognition candidate to the recognition candidate at the corresponding position. That is, the score represents likelihood of a character string from the head recognition candidate to the recognition candidate at the corresponding position. The code is a character code representing a character as the recognition candidate at the corresponding position.

The pair of the position number and the matching result number represents a position number associated with the immediately preceding matching result and a number of the immediately preceding matching result, respectively, in a process of generating the matching result while following the character candidate from the head to the corresponding position one by one and causing DFAα to transition using the recognition candidate of the character candidate as an input symbol. The pair of the position number and the matching result number is referred to when the result extracting unit 54 extracts the character string as the recognition result.

Figure 19:
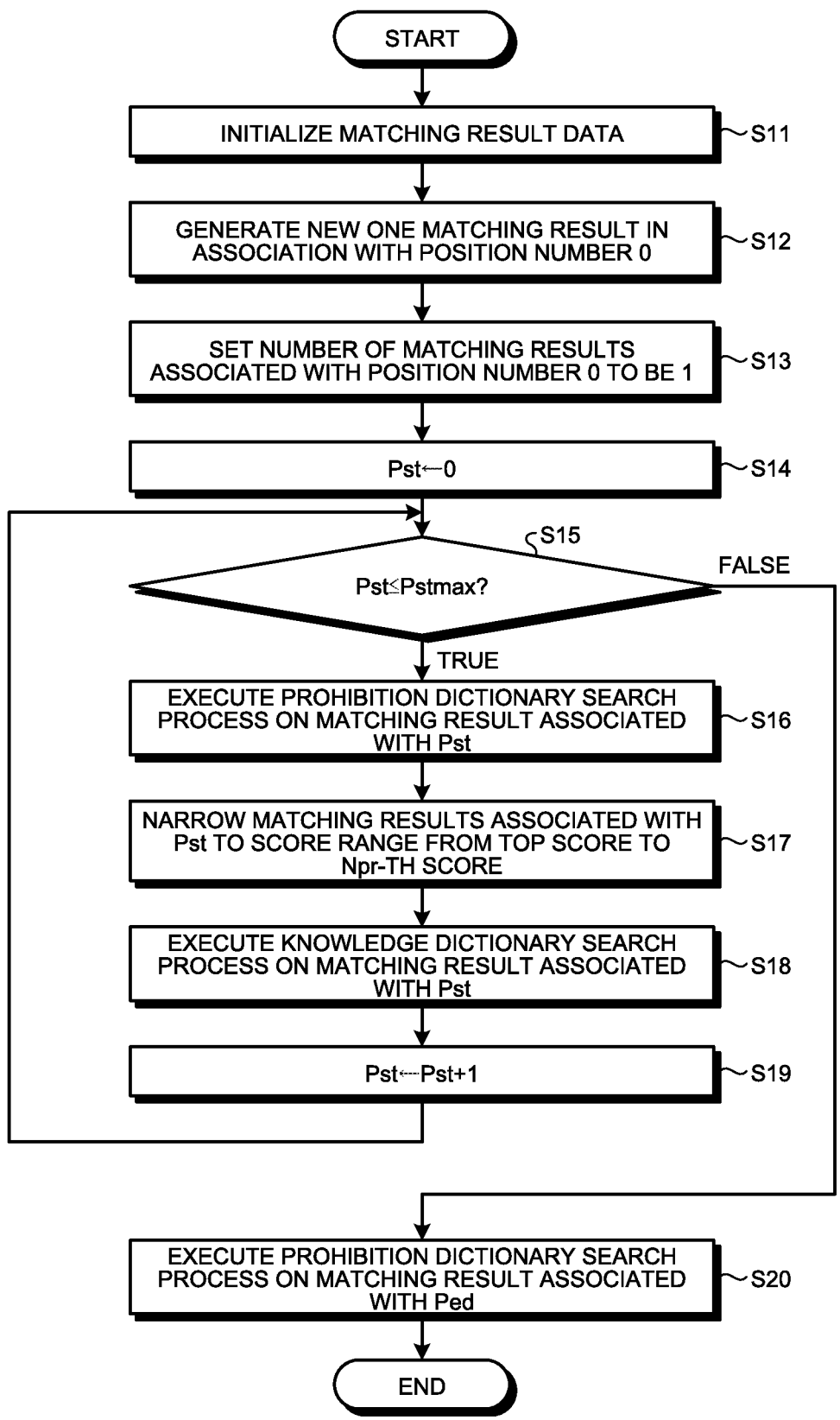
FIG. 19 is a flowchart illustrating matching process.

FIG. 19 is a flowchart illustrating matching process. The following describes details about the matching process at Step S4 illustrated in FIG. 2 with reference to FIG. 19.

First, at Step S11, the matching unit 46 initializes the matching result data. Specifically, the matching unit 46 sets the number of the matching results to be 0 for all position numbers of the matching result data, and causes the matching result array to be empty.

Subsequently, at Step S12, the matching unit 46 generates a new matching result in association with the position number 0. In the new matching result, the state number α and the state number β are set to be 0, the score is set to be 0, the position number and the matching result number are set to be −1, and the code is set to be −1. Subsequently, at Step S13, the matching unit 46 sets the number of the matching results associated with the position number 0 to be 1. At Step S14, the matching unit 46 then substitutes 0 into a variable Pst representing the position number.

Subsequently, at Step S15, the matching unit 46 determines whether Pst is equal to or smaller than Pstmax. Pstmax is a value obtained by subtracting 1 from the last position number Ped. If Pst is equal to or smaller than Pstmax (True at Step S15), the matching unit 46 advances the process to Step S16.

At Step S16, the matching unit 46 calls the prohibition processing unit 52. At Step S16, the prohibition processing unit 52 executes prohibition dictionary search process on each matching result associated with the position number Pst using the prohibition dictionary. With this, the prohibition processing unit 52 can delete the matching result obtained by matching the character string including the prohibition target character string with the knowledge dictionary. Details about the prohibition dictionary search process will be described later with reference to FIGS. 22 and 23.

Subsequently, at Step S17, the matching unit 46 narrows the matching results associated with Pst to a score range from the top score to the Npr-th score. That is, the matching unit 46 deletes matching results having a score lower than the Npr-th score.

Subsequently, at Step S18, the matching unit 46 executes knowledge dictionary search process on each matching result associated with Pst using the knowledge dictionary. With this, the matching unit 46 can generate a new matching result associated with a position number after Pst. The knowledge dictionary search process will be described later with reference to FIGS. 20 and 21.

Subsequently, at Step S19, the matching unit 46 adds 1 to Pst. After ending Step S19, the matching unit 46 returns the process to Step S15. The matching unit 46 then repeats the processes from Step S16 to Step S19 until Pst exceeds Pstmax.

If Pst is not equal to or smaller than Pstmax (False at Step S15), the matching unit 46 advances the process to Step S20. At Step S20, the matching unit 46 calls the prohibition processing unit 52. At Step S20, the prohibition processing unit 52 executes prohibition dictionary search process on each matching result associated with the last position number Ped using the prohibition dictionary. Accordingly, the prohibition processing unit 52 can delete the matching result obtained by matching the prohibition target character string with the knowledge dictionary. After ending the process at Step S20, the matching unit 46 ends this procedure.

Figure 20:
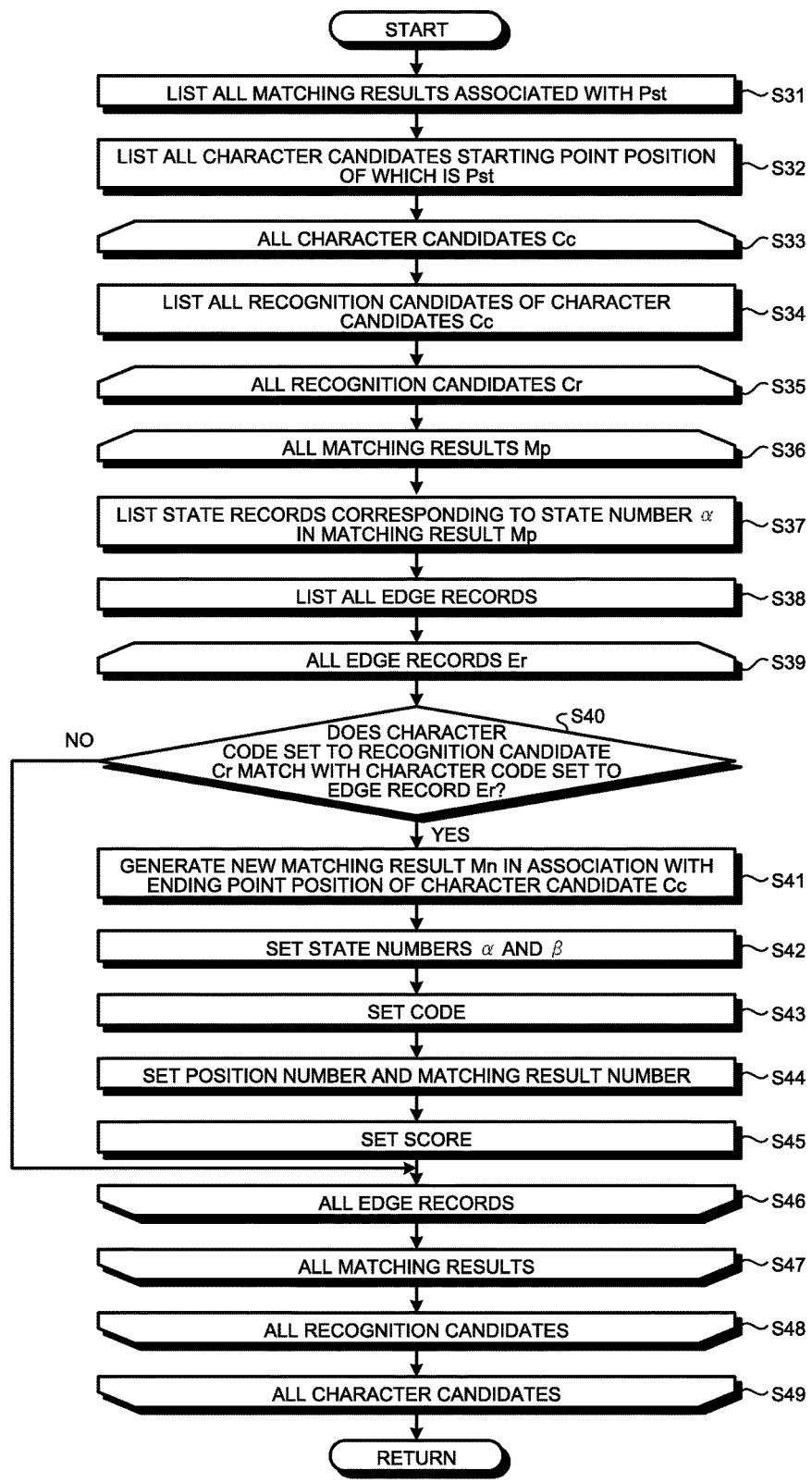
FIG. 20 is a flowchart illustrating knowledge dictionary search process.
Figure 21:
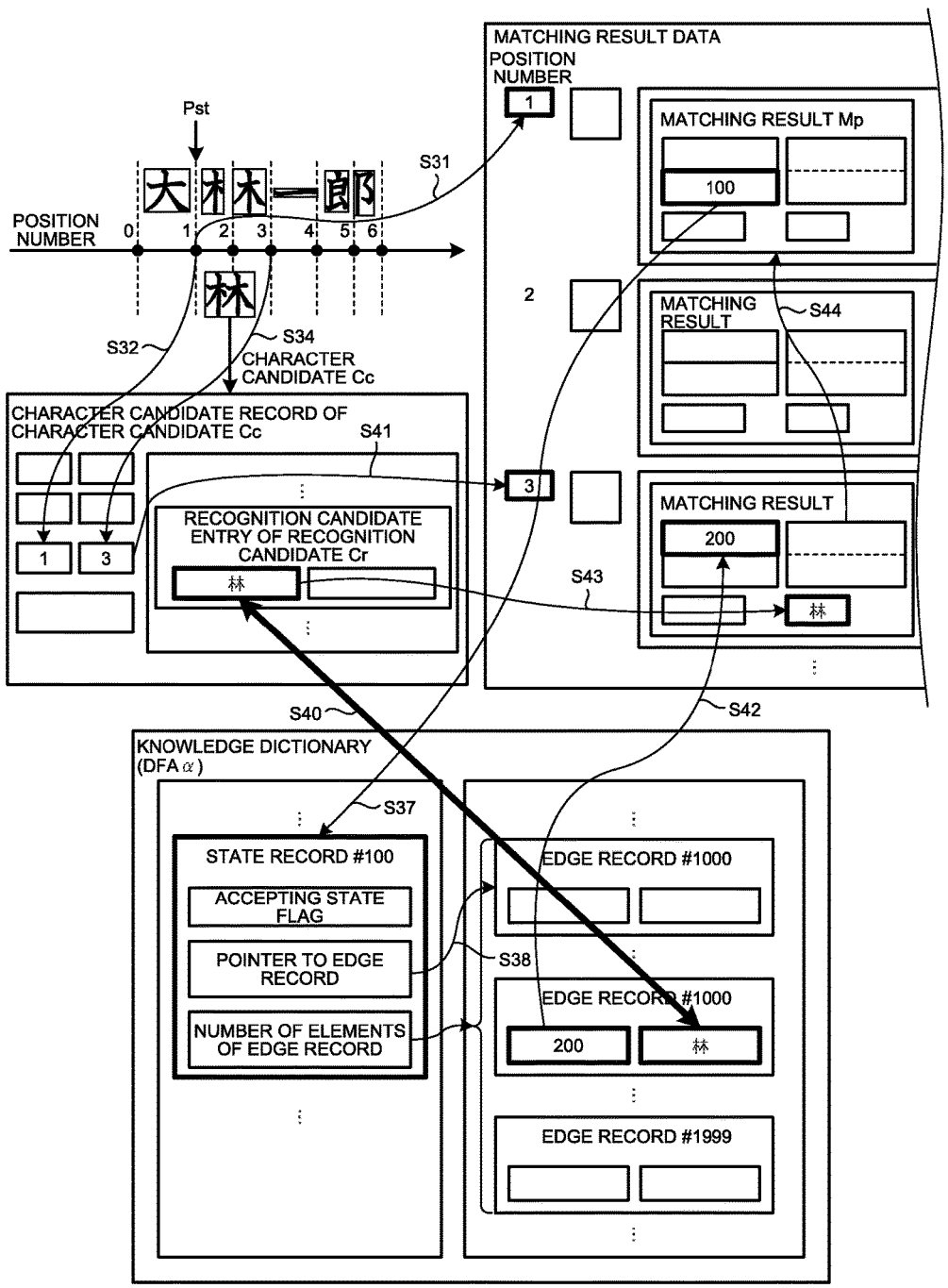
FIG. 21 is a diagram illustrating an example of a procedure of data access in the knowledge dictionary search process.

FIG. 20 is a flowchart illustrating the knowledge dictionary search process. FIG. 21 illustrates an example of a procedure of data access in the knowledge dictionary search process.

The following describes the knowledge dictionary search process at Step S18 in FIG. 19 with reference to FIGS. 20 and 21. At Step S31, the matching unit 46 refers to the matching result data, and lists all matching results associated with Pst.

Subsequently, at Step S32, the matching unit 46 refers to the character candidate record in the array of the character candidate data, and lists all character candidates the starting point position of which is Pst. By scanning all entries the starting point number of which in the character candidate matrix matches with Pst, and collecting the character candidate numbers other than −1, the matching unit 46 can list all character candidates the starting point position of which is Pst.

Subsequently, the matching unit 46 executes the processes from Step S34 to Step S48 on each of all the character candidate records listed at Step S32 (loop processing between Step S33 and Step S49). In the following description, a character candidate corresponding to a character candidate record as a processing target in this loop processing is referred to as a "character candidate Cc".

At Step S34, the matching unit 46 refers to the recognition candidate array of the character candidate record corresponding to the character candidate Cc, and lists all recognition candidate entries of the character candidate.

Subsequently, the matching unit 46 executes the processes from Step S36 to Step S47 on each of all the recognition candidate entries listed at Step S34 (loop processing between Step S35 and Step S48). In the following description, a recognition candidate corresponding to a recognition candidate entry as a processing target in this loop processing is referred to as a "recognition candidate Cr".

Subsequently, the matching unit 46 executes the processes from Step S37 to Step S46 on each of all the matching results associated with Pst listed at Step S31 (loop processing between Step S36 and Step S47). In the following description, a matching result as a processing target in this loop processing is referred to as a "matching result Mp".

At Step S37, the matching unit 46 refers to the knowledge dictionary (DFAα), and lists state records corresponding to the state number α included in the matching result Mp.

Subsequently, at Step S38, by specifying a range in which the edge record representing the edge leaving the state of the state number α is stored based on the number of elements of the edge record and the pointer to the edge record included in the state records listed at Step S37, the matching unit 46 lists all edge records representing the edge leaving the state of the state number α.

Subsequently, the matching unit 46 executes the processes from Step S40 to Step S45 on each of all the edge records listed at Step S38 (loop processing between Step S39 and Step S46). In the following description, an edge record as a processing target in this loop processing is referred to as an "edge record Er".

At Step S40, the matching unit 46 determines whether the character code set to the recognition candidate entry of the recognition candidate Cr matches with the character code set to the edge record Er. If the character codes do not match with each other (No at Step S40), the matching unit 46 advances the process to the next edge record, and repeats the processes from Step S40. If the character codes match with each other (Yes at Step S40), the matching unit 46 advances the process to Step S41.

At Step S41, the matching unit 46 generates a new matching result Mn in association with the ending point position of the character candidate record of the character candidate Cc, and writes the matching result Mn in the matching result data.

Subsequently, at Step S42, the matching unit 46 sets, as the state number α, a state number set to the edge record Er (a state number of the transition destination) to the new matching result Mn. The matching unit 46 sets −1 to the new matching result Mn as the state number β.

Subsequently, at Step S43, the matching unit 46 sets, to the new matching result Mn as a code, a character code set to the recognition candidate entry of the recognition candidate Cr.

Subsequently, at Step S44, the matching unit 46 sets, to the new matching result Mn as a position number, the position number Pst associated with the matching result Mp. The matching unit 46 stores, in the new matching result Mn, a number of the matching result Mp as a matching result number.

Subsequently, at Step S45, the matching unit 46 sets, to the new matching result Mn as a score, a value obtained by adding the score stored in the matching result Mp to the similarity stored in the recognition candidate entry of the recognition candidate Cr.

At Step S46, after ending the processes from Step S40 to Step S45 for all edge records, the matching unit 46 leaves the loop and advances the process to Step S47.

At Step S47, after ending the processes from Step S37 to Step S46 for all matching results associated with Pst, the matching unit 46 leaves the loop and advances the process to Step S48.

At Step S48, after ending the processes from Step S36 to Step S47 for all recognition candidate entries corresponding to the character candidate Cc, the matching unit 46 leaves the loop and advances the process to Step S49.

At Step S49, after ending the processes from Step S34 to Step S48 for all character candidate records, the matching unit 46 leaves the loop and ends this procedure.

In this way, the matching unit 46 writes, in the matching result of a first character candidate, the number (state number α) indicating the state of the knowledge dictionary (DFAα) reached through matching. In matching a second character candidate subsequent to the first character candidate with the knowledge dictionary (DFAα), the matching unit 46 follows an edge corresponding to state transition based on the recognition candidate of the second character candidate from the state indicated by the number (state number α) written in the matching result of the first character candidate to match the second character candidate.

Figure 22:
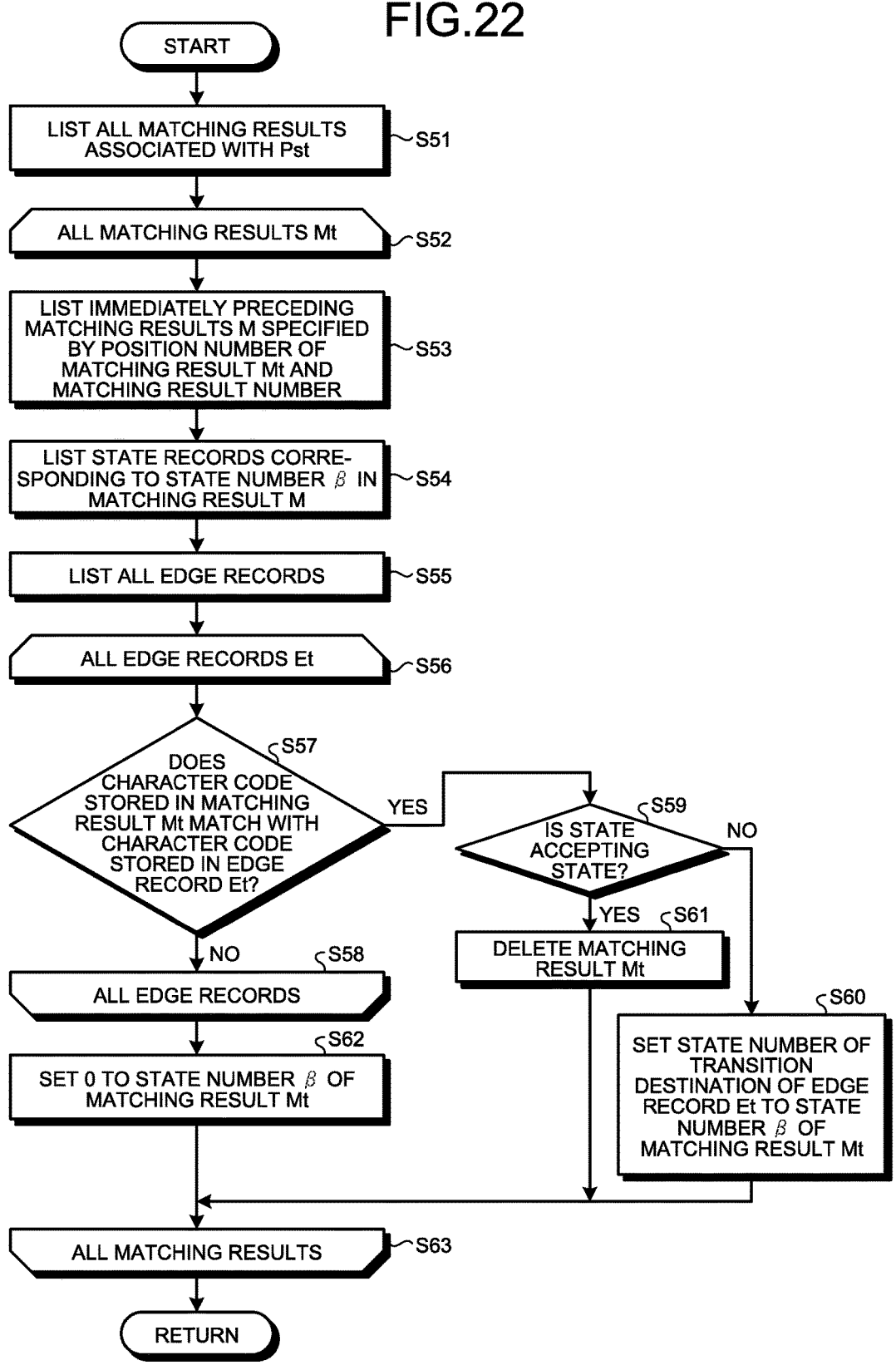
FIG. 22 is a flowchart illustrating prohibition dictionary search process.
Figure 23:
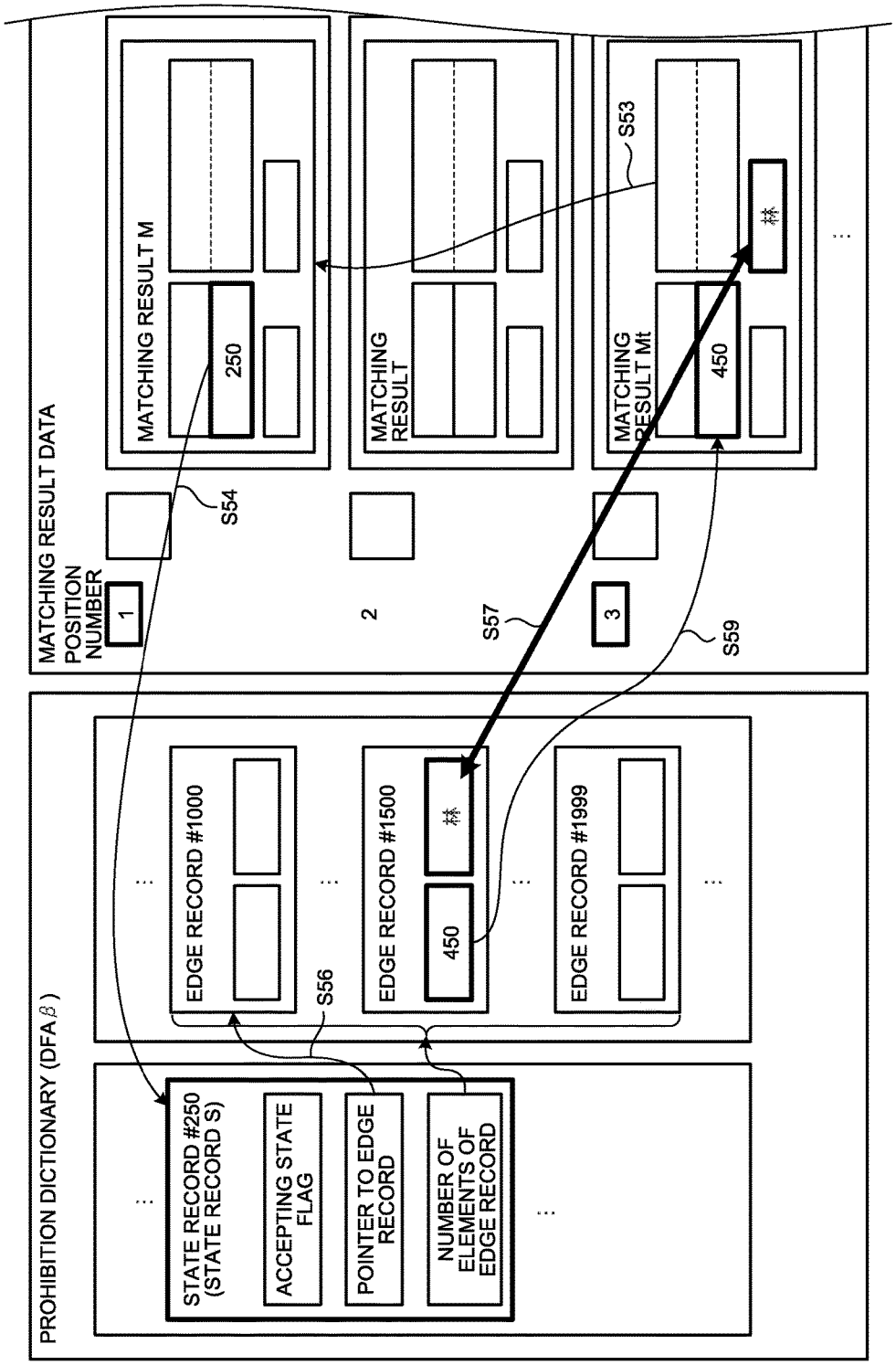
FIG. 23 is a diagram illustrating an example of a procedure of data access in the prohibition dictionary search process.

FIG. 22 is a flowchart illustrating the prohibition dictionary search process. FIG. 23 illustrates a flow of data in the prohibition dictionary search process.

The following describes the prohibition dictionary search process with reference to FIGS. 22 and 23. First, at Step S51, the prohibition processing unit 52 refers to the matching result data, and lists all matching results associated with Pst.

Subsequently, the prohibition processing unit 52 executes the processes from Step S53 to Step S62 on each of all the matching results listed at Step S51 (loop processing between Step S52 and Step S63). In the following description, a matching result as a processing target in this loop processing is referred to as a "matching result Mt".

At Step S53, the prohibition processing unit 52 acquires an immediately preceding matching result M specified by the position number stored in the matching result Mt and the matching result number.

Subsequently, at Step S54, the prohibition processing unit 52 refers to the prohibition dictionary (DFAβ), and acquires a state record corresponding to the state number β stored in the immediately preceding matching result M.

Subsequently, at Step S55, by specifying a range in which the edge record representing the edge leaving the state of the state number β is stored based on the number of elements of the edge record and the pointer to the edge record stored in the state record acquired at Step S54, the prohibition processing unit 52 lists all edge records representing the edge leaving the state of the state number β.

Subsequently, in the loop processing between Step S56 and Step S58, the prohibition processing unit 52 executes determining process at Step S57 on each of all the edge records listed at Step S55. In the following description, an edge record as a processing target in this loop processing is referred to as an "edge record Et".

At Step S57, the prohibition processing unit 52 determines whether the character code stored in the matching result Mt as a processing target matches with the character code stored in the edge record Et. If the character codes do not match with each other (No at Step S57), the prohibition processing unit 52 advances the process to the next edge record, and repeats the process at Step S57. If the character codes match with each other (Yes at Step S57), the prohibition processing unit 52 leaves the loop processing between Step S56 and Step S58, and advances the process to Step S59.

At Step S59, the prohibition processing unit 52 checks the accepting state flag of the state record St that is specified by the state number of the transition destination of the edge record Et, and determines whether the state of DFAβ corresponding to the state record St is the accepting state.

If the state is the accepting state (Yes at Step S59), the prohibition processing unit 52 deletes the matching result Mt at Step S61. If the state is not the accepting state (No at Step S59), at Step S60, the prohibition processing unit 52 sets the state number of the transition destination of the edge record Et to the matching result Mt as the state number β.

If the character codes do not match with each other for all edge records in the loop processing between Step S56 and Step S58, the prohibition processing unit 52 advances the process to Step S62. At Step S62, the prohibition processing unit 52 sets 0 representing an initial state to the matching result Mt as the state number β.

After ending the process at Step S60, Step S61, or Step S62, the prohibition processing unit 52 repeats the processes from Step S52 for the next matching result.

At Step S63, after ending the processes from Step S53 to Step S62 for all matching results, the prohibition processing unit 52 leaves the loop and ends this procedure.

In this way, the prohibition processing unit 52 writes, in a first matching result, the number (state number β) indicating the state of the prohibition dictionary (DFAβ) reached through matching of the character string specified by the first matching result. In matching a character string specified by a second matching result obtained by matching the second character candidate subsequent to the first matching result with the knowledge dictionary (DFAα), the prohibition processing unit 52 follows an edge corresponding to state transition based on the recognition candidate of the second character candidate from the state of DFAβ indicated by the number written in the first matching result to match the character string specified by the second matching result.

Figure 24:
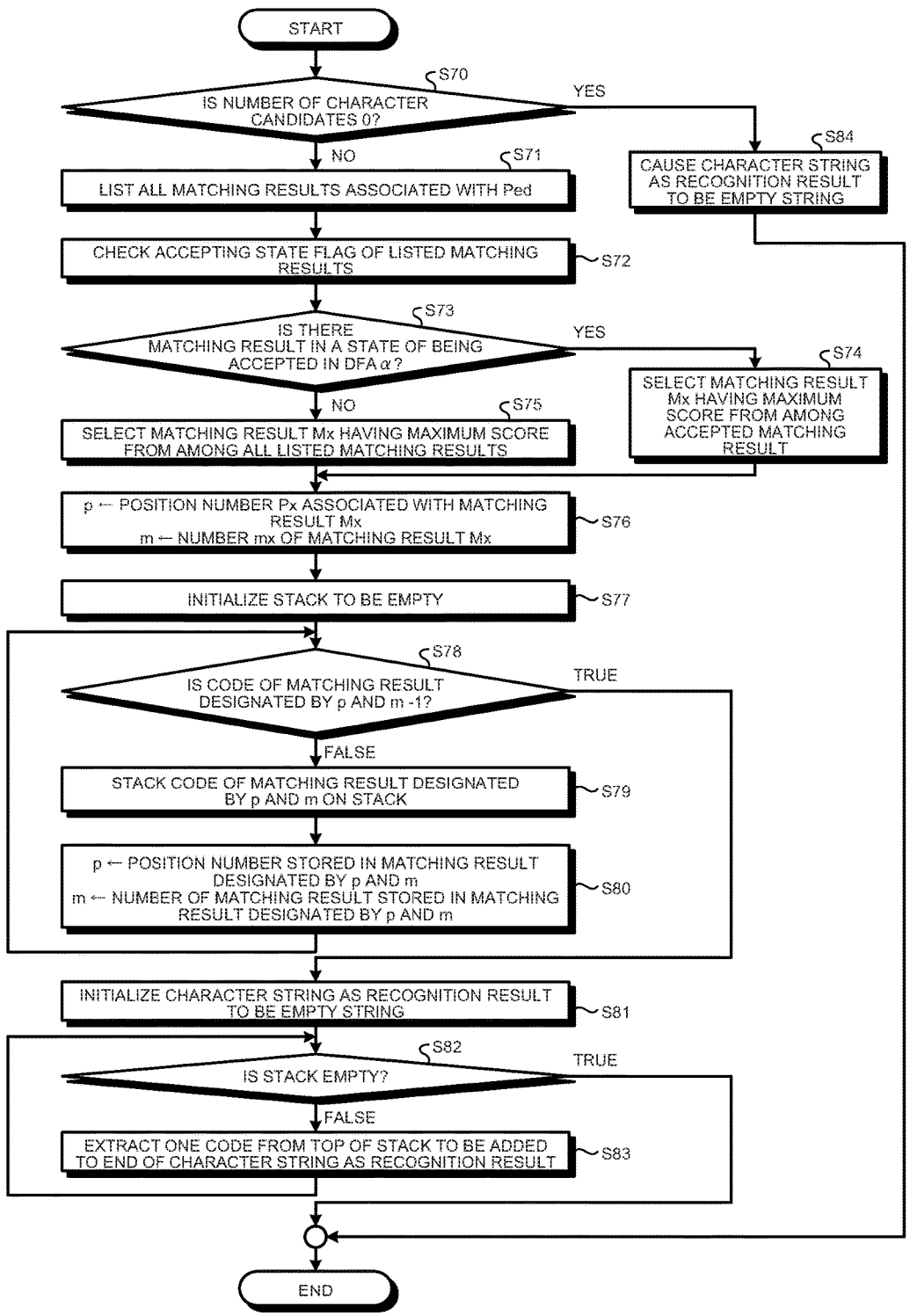
FIG. 24 is a flowchart illustrating a process procedure of result extraction.
Figure 25:
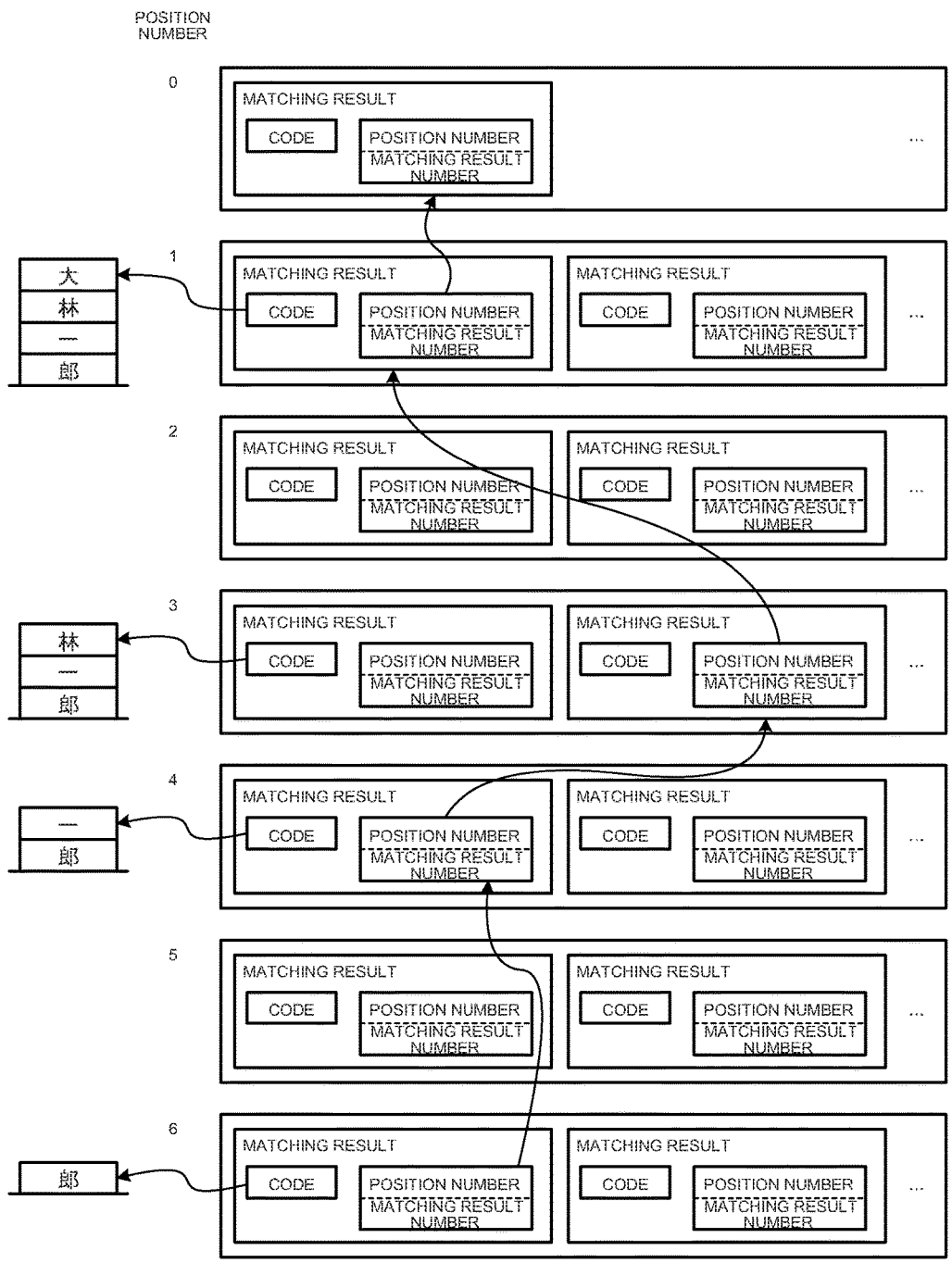
FIG. 25 is a diagram illustrating an example of data that is referred to in result extraction and character codes stacked on a stack.

FIG. 24 is a diagram illustrating a process procedure of result extraction performed by the result extracting unit. FIG. 25 is a diagram illustrating a state of data that is referred to in result extraction and character codes stacked on a stack.

Result extraction at Step S5 illustrated in FIG. 2 is performed by the result extracting unit 54. The following describes details about result extraction with reference to FIGS. 24 and 25. First, at Step S70, the result extracting unit 54 checks whether the number of character candidates is 0. If the number of character candidates is 0, the result extracting unit 54 causes the character string as a recognition result to be an empty string at Step S84, and ends this procedure. If the number of character candidates is not 0, at Step S71, the result extracting unit 54 lists all matching results associated with the last position number Ped, and executes the processes subsequent to Step S72.

Subsequently, at Step S72, the result extracting unit 54 acquires the state record corresponding to the state number α from the knowledge dictionary (DFAα) for each of the matching results listed at Step S71, and checks the accepting state flag.

Subsequently, at Step S73, the result extracting unit 54 determines whether there is a matching result in which the state corresponding to the state number α is the accepting state. In the following description, the matching result in which the state corresponding to the state number α is the accepting state is referred to as a "matching result in a state of being accepted in DFAα". If there is the matching result in a state of being accepted in DFAα (Yes at Step S73), at Step S74, the result extracting unit 54 selects a matching result having a maximum score as the matching result Mx from among matching results in a state of being accepted in DFAα. If there is no matching result in a state of being accepted in DFAα (No at Step S73), at Step S75, the result extracting unit 54 selects a matching result having a maximum score as the matching result Mx from among all the listed matching results.

Following the process at Step S74 or Step S75, at Step S76, the result extracting unit 54 substitutes a position number px associated with the selected matching result Mx into a variable p representing the position number. The result extracting unit 54 substitutes a number mx of the selected matching result Mx into a variable m representing the matching result number.

Subsequently, at Step S77, the result extracting unit 54 causes a stack, which is a First In Last Out (FILO) memory, to be empty.

Subsequently, at Step S78, the result extracting unit 54 determines whether a code of the matching result designated by p and m is −1. If the code of the matching result designated by p and m is not −1 (false at Step S78), the result extracting unit 54 advances the process to Step S79.

At Step S79, the result extracting unit 54 stacks the code stored in the matching result designated by p and m on a stack. Subsequently, at Step S80, the result extracting unit 54 substitutes, into p, the position number stored in the matching result designated by p and m, and substitutes, into m, the matching result number stored in the matching result designated by p and m.

After ending the process at Step S80, the result extracting unit 54 returns the process to Step S78, and repeats the processes at Step S79 and Step S80 until the code stored in the matching result designated by p and m becomes −1. Due to this, as illustrated in FIG. 25, the result extracting unit 54 can select the character code sequentially from the end of the character string and stack the selected codes on the stack.

If the code of the matching result designated by p and m is −1 (true at Step S78), that is, if the position number designates a matching result associated with 0, the result extracting unit 54 advances the process to Step S81. At Step S81, the result extracting unit 54 initializes the character string as a recognition result stored in the memory to be an empty string.

Subsequently, at Step S82, the result extracting unit 54 determines whether the stack is empty. If the stack is not empty (false at Step S82), at Step S83, the result extracting unit 54 extracts one code from the top of the stack, and adds the code to the end of the character string as a recognition result stored in the memory.

After ending the process at Step S83, the result extracting unit 54 returns the process to Step S82, and repeats the process at Step S83 until the stack becomes empty. With this, the result extracting unit 54 can generate a character string from the head to the end.

If the stack becomes empty (true at Step S82), the result extracting unit 54 ends the processing in this procedure.

As described above, the recognition device 10 according to the present embodiment deletes the matching result obtained by matching the character string including the prohibition target character string with the knowledge dictionary using the prohibition dictionary in which the prohibition target character string is modeled. With this, the recognition device 10 according to the present embodiment can accurately recognize the character string by efficiently excluding a character string not to be used, a character string prohibited to be used, and the like.

Modification

The recognition device 10 according to a modification has a configuration similar to that described with reference to FIG. 1 to FIG. 25 except that a format of the knowledge dictionary and the matching result data, and functions of the matching unit 46, the prohibition processing unit 52, and the result extracting unit 54 are different from those described above. The following describes a difference in the configuration of the recognition device 10 according to the modification from the configuration described with reference to FIG. 1 to FIG. 25.

FIG. 26 is a diagram illustrating an example of characters used as a recognition result in the recognition device 10 according to the modification, and a symbol representing classification of the characters. FIG. 27 is a diagram illustrating an example of content of the knowledge dictionary in which a character string recognized by the recognition device 10 according to the modification is represented as a string of symbols representing classification of the character.

The recognition device 10 according to the modification uses the knowledge dictionary in which the character string obtained by arranging symbols representing classification of the character is modeled. By way of example, as the symbols representing classification of the character, used are a symbol "N" representing numbers from 1 to 9, a symbol "n" representing numbers from 0 to 9, a symbol "-" representing a hyphen, and a symbol "M" representing a character used for a name of a condominium, a name of an apartment house, and a name of a building. The knowledge dictionary includes a wild card character string in which the symbols are arranged as illustrated in FIG. 27.

FIG. 28 is a diagram illustrating an example of matching result data according to the modification. In the present modification, each matching result included in the matching result data includes a group of a score s, the number of replaced characters c, and a character string w obtained by partially replacing the wild card character string with a recognition result.

The matching result data includes, corresponding to each position number, an array in which the matching result is stored and the number of elements of the array. In FIG. 28, an underlined character of the character string w as a matching result indicates a portion obtained by replacing the wild card with the recognition result.

In the present modification, first, the matching unit 46 copies each character string included in the knowledge dictionary, and sets the character string to an element of the array of the matching result of the position number 0 to initialize the array of the matching result of the position number 0. To each matching result, 0 is set as the score, 0 is set as the number of replaced characters, and the character string copied from the knowledge dictionary is set as the character string w. Subsequently, the matching unit 46 generates matching results subsequent to the position number Pst+1 while sequentially increasing the position number Pst one by one from 1 to Pstmax.

In the present modification, in knowledge dictionary search process, the matching unit 46 acquires the number of replaced characters c of the matching result. If the c-th character in the character string w as a matching result matches with the character code of the recognition candidate Cr of the character candidate Cc, the matching unit 46 generates a new matching result Mn in association with a position number equal to the ending point number of the character candidate Cc. To the new matching result Mn, set are a score obtained by adding similarity of the recognition candidate Cr to a score of an immediately preceding matching result, the number of replaced characters c+1, and a character string obtained by replacing the c-th character of the character string w as a matching result with the recognition candidate Cr.

In the present modification, in prohibition dictionary search process, the prohibition processing unit 52 acquires the number of replaced characters c of the matching result, and checks whether a partial character string up to the c−1-th character of the character string as a matching result is accepted in DFAβ stored in the prohibition dictionary. If the partial character string is accepted, the prohibition processing unit 52 deletes the matching result, and if the partial character string is not accepted, the prohibition processing unit 52 causes the matching result to remain.

In this way, the recognition device 10 may match the character strings using any method of obtaining the matching result by matching the character candidate with the knowledge dictionary in which the recognition target character string is modeled. The recognition device 10 may detect the prohibition target character string using any method of detecting the prohibition target character string from the matching result.

Figure 29:
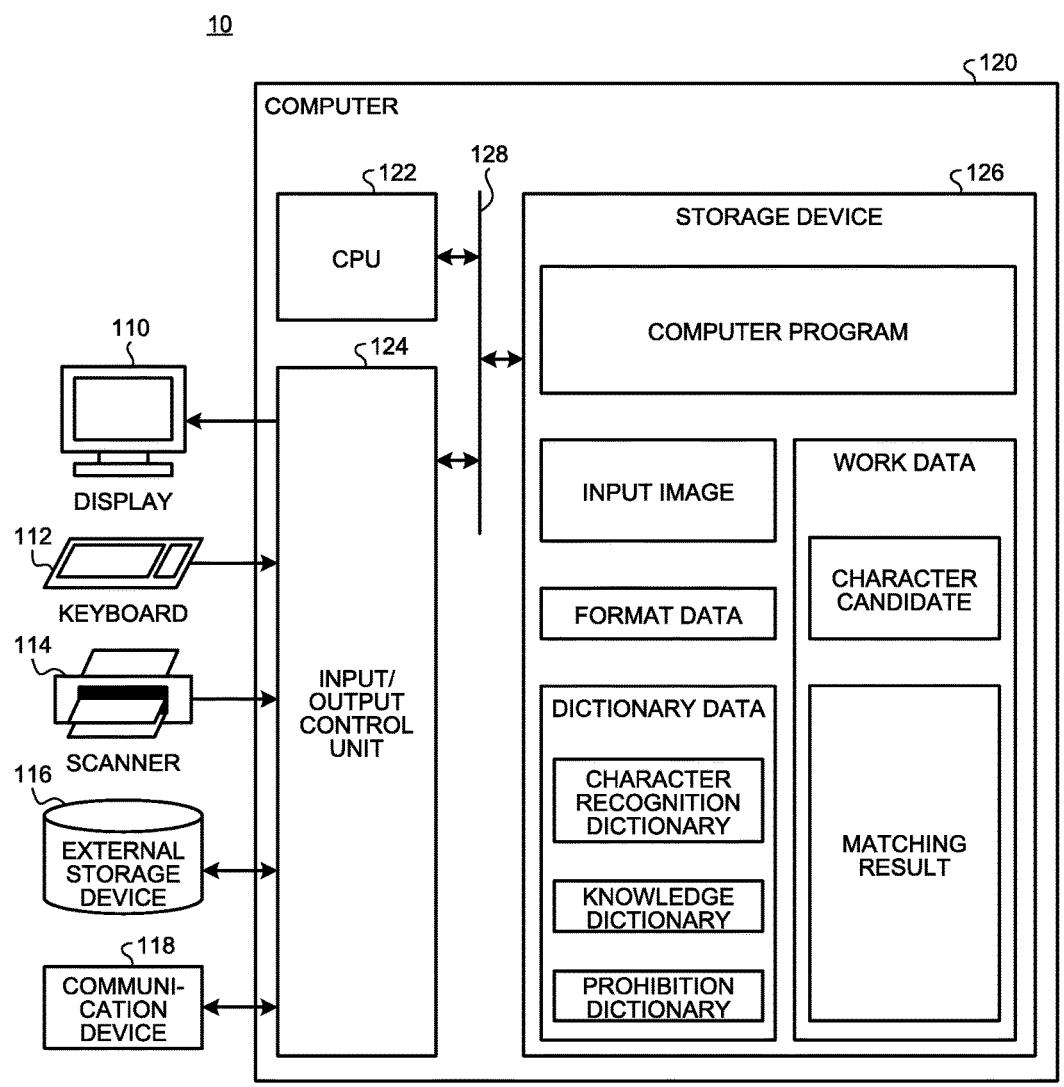
FIG. 29 is a diagram illustrating a hardware configuration of the recognition device 10 according to the embodiment.

FIG. 29 is a diagram illustrating a hardware configuration of the recognition device 10 according to the present embodiment.

The recognition device 10 can be implemented by a typical computer system that can execute a computer program. By way of example, the recognition device 10 includes a display 110, a keyboard 112, a scanner 114, an external storage device 116, a communication device 118, and a computer 120.

The display 110 is a display device, which displays a recognized character string and the like. The keyboard 112 is an input device, which receives an operation from a user to input information. The scanner 114 reads information described on a sheet and the like to acquire an input image and the like. The external storage device 116 is a hard disk drive, an optical disc drive, or the like, which stores various pieces of information. The communication device 118 inputs/outputs information to/from an external computer and the like via the Internet and the like. For example, the communication device 118 acquires an input image from the outside, or outputs a character string to the outside.

By way of example, the computer 120 includes a CPU 122, an input/output control unit 124, and a storage device 126. The CPU 122, the input/output control unit 124, and the storage device 126 are connected to each other via a bus 128.

The CPU 122 executes a computer program to control the entire recognition device 10. The input/output control unit 124 is an interface with the display 110, the keyboard 112, the scanner 114, the external storage device 116, the communication device 118, and the like. The input/output control unit 124 also controls data transfer and the like via the bus 128.

The storage device 126 includes a ROM, a RAM, a hard disk drive, or the like. In the storage device 126, any of the ROM, the RAM, the hard disk drive, and the like can be accessed using the same address space. The storage device 126 stores a computer program, an input image, format data, dictionary data (a character recognition dictionary, a knowledge dictionary, and a prohibition dictionary), work data (a character candidate and a matching result), and the like. These pieces of data may be stored in any device (a ROM, a RAM, and a hard disk drive) constituting the storage device. Part or all of the pieces of data may be stored in the external storage device 116, a server accessed via the communication device 118, and the like.

The computer program executed by the recognition device 10 according to the present embodiment is recorded and provided in a computer-readable recording medium such as a compact disc read only memory (CD-ROM), a flexible disk (FD), a compact disc recordable (CD-R), and a digital versatile disc (DVD), as an installable or executable file. The computer program executed by the recognition device 10 according to the present embodiment may be stored in a computer connected to a network such as the Internet and provided by being downloaded via the network. Furthermore, the computer program executed by the recognition device 10 according to the present embodiment may be provided or distributed via a network such as the Internet.

The computer program executed by the recognition device 10 according to the present embodiment has a module configuration including the components described above (the input unit 30, the candidate detection unit 36, the recognition unit 42, the matching unit 46, the prohibition processing unit 52, the result extracting unit 54, and the output unit 56). As actual hardware, the components are loaded into a main storage device when the CPU 122 (processor) reads the computer program from the storage medium to be executed, and the input unit 30, the candidate detection unit 36, the recognition unit 42, the matching unit 46, the prohibition processing unit 52, the result extracting unit 54, and the output unit 56 are generated on the storage device 126. Part or all of the input unit 30, the candidate detection unit 36, the recognition unit 42, the matching unit 46, the prohibition processing unit 52, the result extracting unit 54, and the output unit 56 may be configured as hardware.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A recognition device comprising:
a memory; and
a hardware processor configured to:
- detect, from an input image, character candidates, wherein each of the character candidates is a set of pixels estimated to include a character;
- recognize each of the character candidates and generate one or more recognition candidates, wherein each of the one or more recognition candidates is a character of a candidate as a recognition result;
- match each of the one or more recognition candidates with a knowledge dictionary in which a recognition target character string is modeled, and generate matching results obtained by matching a character string estimated to be included in the input image with the knowledge dictionary; and
- match each of the matching results with a prohibition dictionary in which a prohibition target character string is modeled, and delete, from the matching results, a matching result obtained by matching a character string including the prohibition target character string with the prohibition dictionary.

2. The device according to claim 1, wherein the hardware processor is further configured to:
- assign a score to each of the matching results representing likelihood of a corresponding character string, and
- select, from the matching results, a matching result based on the score assigned to the matching result and extract a character string specified by the selected matching result.

3. The device according to claim 1, wherein the knowledge dictionary is a finite automaton in which a recognition target character string is modeled.

4. The device according to claim 3, wherein
the knowledge dictionary is a first deterministic finite automaton, and
in the matching of each of the one or more recognition candidates with the knowledge dictionary, the hardware processor is configured to:
- write, in a matching result of a first character candidate, a number indicating a state of the first deterministic finite automaton reached through matching, and
- follow, in matching a second character candidate subsequent to the first character candidate with the first deterministic finite automaton, an edge corresponding to a state transition based on a recognition candidate of the second character candidate from the state indicated by the number written in the matching result of the first character candidate to match the second character candidate.

5. The device according to claim 1, wherein in the matching of each of the matching results with the prohibition dictionary, the hardware processor is configured to match the character string specified by the matching result with the prohibition dictionary.

6. The device according to claim 5, wherein the prohibition dictionary is a finite automaton in which a prohibition target character string is modeled.

7. The device according to claim 6, wherein
the prohibition dictionary is a second deterministic finite automaton, and
in the matching of each of the matching results with the prohibition dictionary, the hardware processor is configured to:
- write, in the first matching result, a number indicating a state of the second deterministic finite automaton reached through matching of a character string specified by a first matching result, and
- follow, in matching a character string specified by a second matching result obtained by matching a second character candidate subsequent to the first matching result with the second deterministic finite automaton, an edge corresponding to a state transition based on a recognition candidate of the second character candidate from the state indicated by the number written in the first matching result to match the character string specified by the second matching result.

8. The device according to claim 7, wherein the second deterministic finite automaton is configured to transition to an accepting state when a character string including a prohibition target character string is received.

9. A recognition method comprising:
- detecting, from an input image, character candidates that each comprise a set of pixels estimated to include a character;
- recognizing each of the character candidates and generating one or more recognition candidates that each comprise a character of a candidate as a recognition result;
- matching each of the one or more recognition candidates with a knowledge dictionary in which a recognition target character string is modeled, and generating matching results obtained by matching a character string estimated to be included in the input image with the knowledge dictionary; and
- matching each of the matching results with a prohibition dictionary in which a prohibition target character string is modeled, and deleting, from the matching results, a matching result obtained by matching a character string including the prohibition target character string with the prohibition dictionary.

10. A computer program product comprising a non-transitory computer-readable medium including programmed instructions for causing a computer to function as a recognition device, the instructions causing the computer to execute:
- detecting, from an input image, character candidates each of which is a set of pixels estimated to include a character;
- recognizing each of the character candidates and generating one or more recognition candidates each of which is a character of a candidate as a recognition result;
- matching each of the one or more recognition candidates with a knowledge dictionary in which a recognition target character string is modeled, and generating matching results obtained by matching a character string estimated to be included in the input image with the knowledge dictionary; and
- matching each of the matching results with a prohibition dictionary in which a prohibition target character string is modeled, and deleting, from the matching results, a matching result obtained by matching a character string including the prohibition target character string with the prohibition dictionary.

* * * * *